United States Patent
Lee et al.

(10) Patent No.: US 8,000,706 B2
(45) Date of Patent: Aug. 16, 2011

(54) METHOD OF RESELECTING A CELL BASED ON PRIORITIES

(75) Inventors: Seon Don Lee, Anyang-si (KR); Young Dae Lee, Anyang-si (KR); Sung Duck Chun, Anyang-si (KR); Seung June Yi, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 415 days.

(21) Appl. No.: 12/345,138

(22) Filed: Dec. 29, 2008

(65) Prior Publication Data

US 2009/0181676 A1  Jul. 16, 2009

Related U.S. Application Data

(60) Provisional application No. 61/019,575, filed on Jan. 7, 2008, provisional application No. 61/024,193, filed on Jan. 28, 2008.

(30) Foreign Application Priority Data

Nov. 10, 2008  (KR) .................. 10-2008-0110911

(51) Int. Cl.
*H04W 4/00* (2009.01)

(52) U.S. Cl. .............. 455/435.2; 455/437; 455/436; 455/435.3; 455/435.1; 455/439

(58) Field of Classification Search ............. 455/436, 455/437, 439, 443
See application file for complete search history.

(56) References Cited

U.S. PATENT DOCUMENTS

| | | | |
|---|---|---|---|
| 6,421,334 B1 | 7/2002 | Baines | |
| 6,434,389 B1* | 8/2002 | Meskanen et al. | 455/437 |
| 6,870,824 B1 | 3/2005 | Kim et al. | |
| 6,961,570 B2 | 11/2005 | Kuo et al. | |
| 7,209,747 B2 | 4/2007 | Chen | |
| 2002/0126629 A1 | 9/2002 | Jiang et al. | |
| 2003/0224790 A1 | 12/2003 | Choi | |
| 2004/0162074 A1* | 8/2004 | Chen | 455/437 |
| 2004/0208142 A1 | 10/2004 | Saw | |
| 2005/0026597 A1 | 2/2005 | Kim et al. | |
| 2005/0220042 A1 | 10/2005 | Chang et al. | |
| 2006/0035662 A1 | 2/2006 | Jeong et al. | |
| 2006/0104225 A1 | 5/2006 | Kim et al. | |
| 2006/0251023 A1 | 11/2006 | Choi | |
| 2007/0049325 A1 | 3/2007 | Lee | |
| 2007/0115894 A1 | 5/2007 | Herrmann et al. | |
| 2007/0183372 A1 | 8/2007 | Janko et al. | |
| 2007/0202892 A1 | 8/2007 | Voyer | |
| 2009/0086853 A1 | 4/2009 | Ye | |

FOREIGN PATENT DOCUMENTS

| | | |
|---|---|---|
| KR | 10-2004-0008228 A | 1/2004 |
| KR | 10-2005-0014984 A | 2/2005 |
| KR | 10-2005-028254 A | 3/2005 |
| KR | 10-2006-0024756 A | 3/2006 |

(Continued)

*Primary Examiner* — David Q Nguyen
(74) *Attorney, Agent, or Firm* — Birch, Stewart, Kolasch & Birch, LLP

(57) ABSTRACT

A method, device and computer program product for performing cell reselection based on priorities, where the method includes measuring a signal of a candidate cell, and selecting the candidate cell when the signal characteristic of the candidate cell satisfies a certain criterion for a certain time duration, wherein the certain time duration is modified according to a priority of the candidate cell.

12 Claims, 15 Drawing Sheets

FOREIGN PATENT DOCUMENTS

| | | |
|---|---|---|
| KR | 10-0556589 | 3/2006 |
| KR | 10-2007-0080188 A | 8/2007 |
| KR | 10-2007-0120453 A | 12/2007 |
| WO | WO 03/001681 A2 | 1/2003 |
| WO | WO-2006/096036 A1 | 9/2006 |
| WO | WO-2006/118426 A1 | 11/2006 |

* cited by examiner

METHOD OF RESELECTING A CELL BASED ON PRIORITIES

CROSS REFERENCE TO RELATED APPLICATIONS

This application claims the benefit of U.S. provisional application 61/019,575, filed on Jan. 7, 2008, U.S. provisional application 61/024,193, filed on Jan. 28, 2008, and Korean Patent Application No. 10-2008-0110911, filed on Nov. 10, 2008, which are each hereby incorporated by reference as if fully set forth herein.

BACKGROUND OF THE INVENTION

1. Field of the Invention

The present invention relates to a wireless communication system, and more particularly, to a method, device and computer program product for reselecting a cell in a wireless communication system.

2. Discussion of the Background Art

A basic purpose of selecting a cell is to register a user equipment (UE) in a network and receive a service from a base station. If the intensity and the quality of a signal between a UE and a base station become inferior due to the mobility of the UE, the UE reselects another cell in order to maintain data transmission quality. In the present specification, the characteristic of a physical signal associated with a signal-to-noise interference ratio and the intensity of a signal is called a signal characteristic.

Conventionally, methods for reselecting a cell differ according to parameters associated with a radio access technology (RAT) and a frequency characteristic of the cell participating in the reselection of the cell. The conventional methods include:

Intra-frequency cell reselection: A UE reselects a cell having the same center frequency and RAT as a serving cell.

Inter-frequency cell reselection: A UE reselects a cell having the same RAT as a serving cell and a center frequency different from the serving cell.

Inter-RAT cell reselection: A UE reselects a cell using a RAT different from a RAT which is being used by a serving cell.

FIG. 1 shows the conventional operation of a UE in an idle mode when the UE is powered on. Referring to FIG. 1, when the UE is powered on, the UE automatically or manually selects a public land mobile network (PLMN) from which a service is desired to be received, and a RAT for communication (S110). The PLMN and RAT information may be selected by the user of the UE or by the PLMN. Alternatively, the PLMN and the RAT information stored in a universal subscriber identity module (USIM) may be used.

Thereafter, the UE performs an initial cell selection process of selecting a cell having a highest value among cells in which the intensity or the quality of a signal measured from a base station is larger than a reference value (S120). The reference value indicates a value which is defined in a system in order to ensure the quality of a physical signal in transmission and reception of data. Accordingly, the reference value may be changed according to the applied RATs. Thereafter, the UE receives system information (SI) that is periodically transmitted by the base station. The SI includes basic information necessary for accessing a network. In addition, the SI may include a neighbor cell list (NCL) associated with cells neighboring with a serving cell. Accordingly, the conventional UE should receive the SI before accessing the base station and should have the newest SI. When the UE is first powered on, the UE selects a cell in order to receive the SI in the idle mode.

The UE registers its information (e.g., international mobile subscriber identity (IMSI)) in a network in order to receive a service (e.g., paging) from the network (S150). The UE does not register its information whenever the cell is selected. Instead, the UE registers its information in the network only if needed. For example, the UE registers its information in the network if network information (e.g., tracking area identity (TAI)) received from the SI is different from the network information about which the UE knows (S140 and S170).

If the intensity or the quality of the signal measured from the base station of the serving cell is lower than the value measured from the base station of a neighbor cell, the UE selects one of other cells providing better signal characteristics than the cell of the base station which the UE accesses. In addition, if priorities are defined in the frequencies or RATs, the cell may be selected in consideration of the priorities (S160). In order to distinguish this process from the initial cell selection process of the step S120, this process (S160) is called a cell reselection process. In a Long Term Evolution (LTE) system, as a signal measurement value, reference symbol received power (RSRP), reference symbol received quality (RSRQ) and received signal strength indicator (RSSI) is being discussed. Long Term Evolution (LTE) is a 4G wireless broadband technology developed by the Third Generation Partnership Project (3GPP), an industry trade group.

In FIG. 1, the basic operation for reselecting the cell according to the signal characteristic by the UE was described. In the LTE, the following parameters are also considered during cell selection.

UE capability
Subscriber information
Camp load balancing
Traffic load balancing

The UE capability parameter includes an indication that the UE selects the cell according to a selectable frequency band. The UE makes the selection according to the selectable frequency band because the frequency band which is available by the UE may be restricted. The subscriber information parameter includes an identification by the UE of a certain cell to be selected or unselected according to the subscriber information or the provider policy. The camp load balancing parameter includes an indication that a cell which is being used by a small number of UEs is selected in order to reduce a data load generated when UEs in the idle mode are activated in another cell. Similarly, the traffic load balancing parameter includes an indication that a cell is changed in order to reduce a data load generated in activated UEs.

In particular, the LTE system has a possibility that the frequency band expands on the basis of the existing UTRAN for the purpose of installation/maintenance/repair. UEs in the same cell share a radio resource for communication, and thus load balancing between cells needs to be achieved in order to efficiently use the radio resource. Accordingly, the camp/traffic load balancing is defined as a necessary requirement of the LTE system.

In the LTE system, in order to efficiently realize the cell selection process, the priority may be defined per selectable frequency or RAT. Accordingly, the UE preferentially selects a certain frequency or RAT at the time of cell selection or cell reselection. If there is a plurality of frequencies/RATs, the frequencies/RATs may be different from one another, some of the frequencies/RATs may be equal to one another, or all the frequencies/RATs are equal to one another. In the LTE system, only a frequency or RAT having a priority is defined as a cell reselection target.

Hereinafter, an operation for performing conventional cell reselection by a UE according to the priority of the frequency or the RAT will be briefly described. If a signal characteristic value of a serving cell does not satisfy a threshold value (e.g., Snonintrasearch), the conventional UE measures the signal of another cell having a frequency/RAT other than the frequency/RAT of the serving cell. At this time, if a cell using the same RAT as the serving cell and using a frequency having a priority different from that of the serving cell is reselected, the UE has only one restriction time duration (e.g., Treselection$_{EUTRAN}$) as a cell reselection criterion regardless of the priority of a candidate cell. That is, a restriction time duration for reselecting a cell of a priority higher than that of the serving cell is equal to a restriction time duration for reselecting a cell of a priority lower than the serving cell. Accordingly, when the conventional UE determines that a time period for which the signal characteristic value of the candidate cell is equal to or greater than the threshold value satisfies the restriction time duration, a probability that the evaluation fails due to radio fluctuation becomes equal in all candidates cells regardless of the priority.

FIG. 2 shows a conventional process of reselecting a cell by a UE, the reselected cell having a different priority. Referring to FIG. 2, when the signal characteristic value of the serving cell is equal to or less than a certain threshold value (e.g., Thresh_serving), the UE begins to perform a search and measurement for reselecting another cell. At this time, the priority of a cell using a first frequency (frequency 1) is lower than a priority of the serving cell and the signal characteristic value thereof is equal to or greater than a certain threshold value Thresh_L. In addition, the priority of a cell using a second frequency (frequency 2) is higher than that of the serving cell and the signal characteristic value thereof is equal to or greater than the certain threshold value Thresh_L. The UE checks whether the cells satisfy the cell reselection criterion during Treselection$_{EUTRAN}$.

In FIG. 2, it is assumed that the value of Treselection$_{EUTRAN}$ is 10 seconds. Accordingly, in order to enable the UE to select the cell using a frequency higher than that of the serving cell, the cell using frequency 2 should have a signal characteristic value equal to or greater than the threshold value (e.g., Thresh_H) for 10 seconds. However, the cell using frequency 2 does not have the signal characteristic value equal to or greater than the threshold value for 10 seconds due to radio fluctuation. When this occurs, a timer for evaluating the signal characteristic value of the cell using the frequency 2 is stopped. In contrast, because the cell using frequency 1 and having the priority lower than that of the serving cell satisfies the signal characteristic value for 10 seconds, the UE reselects the cell using frequency 1, with cell the having the priority lower than that of the serving cell.

If the UE receives a service using the frequency or the RAT having a low priority, the UE periodically or continuously performs a measurement in order to transit to a frequency or RAT having a higher priority. For example, the base station may allocate a highest priority to a certain frequency (e.g., frequency 2) and allocate a low priority to another certain frequency (e.g., frequency 1), for the purpose of load balancing. In this case, the UE receives a service using the frequency (e.g., the frequency 2) having the highest priority. However, if the signal characteristic value of the highest frequency decreases (e.g., due to the movement of the UE), the UE may reselect the cell using the frequency (e.g., frequency 1) having the low priority. In this case, the UE that receives the service from the cell having the low priority continuously perform the measurement in order to select the cell using the frequency (e.g., the frequency 2) having the high priority. That is, the UE should periodically perform the measurement in order to select the cell having the high priority, although the signal characteristic value of the cell which transmits the service is equal to or greater than a certain signal characteristic value. Accordingly, the UE which selects the cell having the low priority may seriously waste power in order to reselect the cell having the high priority.

If priority is used for the purpose of load balancing, the load becomes lower as the priority of the frequency/RAT becomes higher. Accordingly, when the UE selects the cell using the frequency/RAT having the low priority, the bandwidth received from the cell is decreased. That is, when the cell using the frequency having the low priority is selected, the load is relatively high and thus the UE may not sufficiently receive a desired amount of radio resource. Accordingly, it is difficult to ensure sufficient quality of service (QoS) required by the UE. In addition, the bandwidth allocated to the cell cannot be efficiently used.

As described above, if the UE receives the service from the cell using the frequency or RAT having the low priority, it is difficult to provide the sufficient QoS or bandwidth to the user. In addition, since the cell having the high priority is periodically measured, unnecessary power (e.g., battery life) may be expended.

SUMMARY OF THE INVENTION

An object of the present invention is to provide a method, device and computer program product capable of ensuring quality of service (QoS) of a user equipment (UE) and reducing power consumption for movement of the UE in a wireless communication system.

Another object of the present invention is to provide a method, device and computer program product for differentiating reselectability according to a priority when a UE reselects a cell.

A further object of the present invention is to provide a method, device and computer program product for differentiating reselectability according to a relative priority of a cell determined based on a serving cell when a UE reselects a cell having a priority different from that of the serving cell.

An object of the present invention can be achieved by providing a method, device and computer program product for performing cell reselection based on priorities in a wireless communication system, the method including the steps of: measuring a signal of a candidate cell; and selecting the candidate cell when the signal characteristic of the candidate cell satisfies a certain criterion for a certain time duration, wherein the certain time duration is modified according to a priority of the candidate cell.

In another aspect of the present invention, provided herein is a method, device and computer program product for transmitting control information associated with cell reselection in a wireless communication system, the method including the steps of: transmitting first information about priorities of cells; and transmitting second information about a certain time duration for which signal characteristic of a candidate cell should satisfy a certain criterion, wherein the certain time duration is modified according to a priority of the candidate cell.

According to the embodiments of the present invention, the following advantageous effects can be obtained.

First, with the present invention, it is possible to ensure quality of service (QoS) of a user equipment (UE) and reduce power consumption for movement of the UE.

Second, a UE according to the present invention can more readily reselect a cell having a high priority compared with a cell having a low priority.

Third, with the present invention, it is possible to differentiate reselectability according to a relative priority when a UE reselects a cell having a priority different from that of a serving cell.

It will be understood by those skilled in the art from the following description that the effects which can be obtained by the present invention are not limited to the above-described effect and other effects can be also obtained.

BRIEF DESCRIPTION OF THE DRAWINGS

The accompanying drawings, which are included to provide a further understanding of the invention, illustrate embodiments of the invention and together with the description serve to explain the principle of the invention. Wherever possible, the same reference numbers, labels and/or acronyms are used throughout the drawings to refer to the same or like parts.

In the drawings.

DETAILED DESCRIPTION OF THE INVENTION

Hereinafter, additional advantages, objects, and features of the invention will be more readily apparent from consideration of the following detailed description relating to the accompanying drawings. The following embodiments are examples to which the technical features of the present invention are applied to an evolved universal mobile telecommunication system (E-UMTS).

Figure 3:
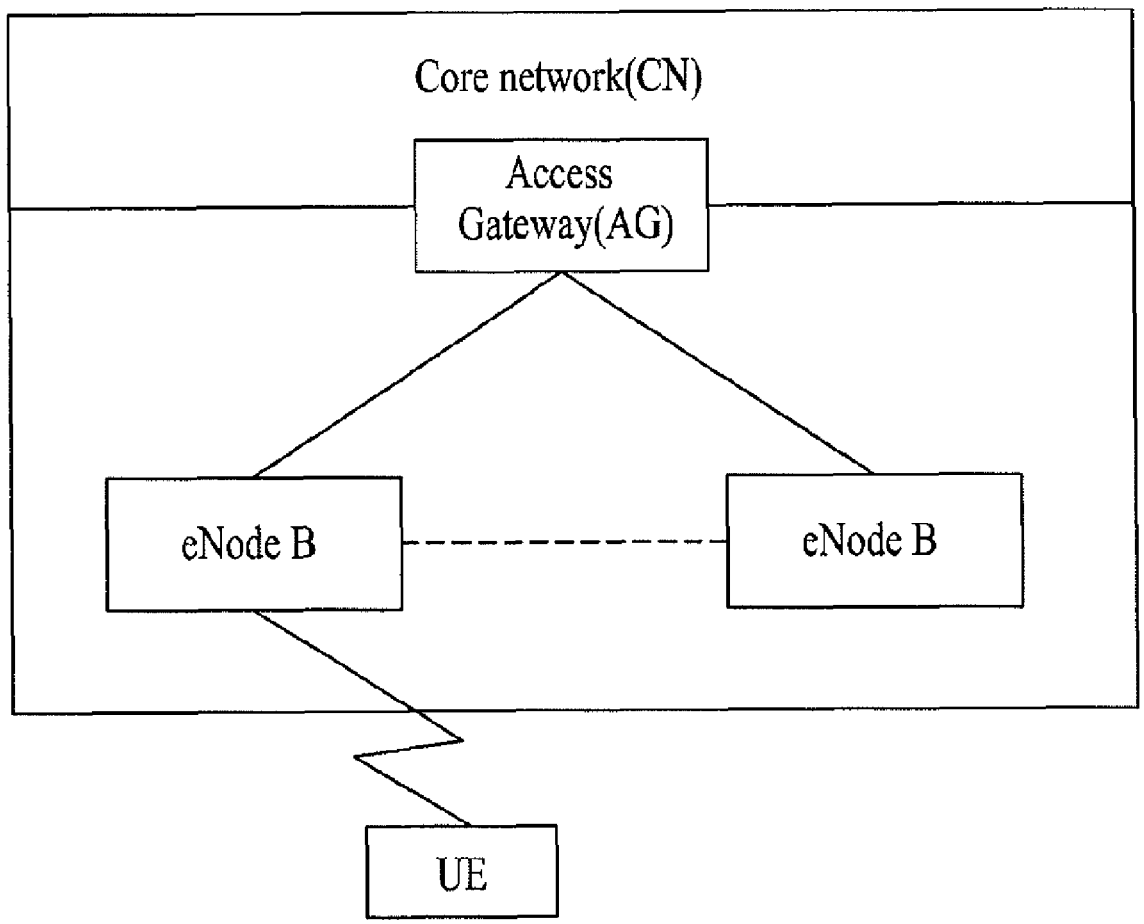
FIG. 3 is a view showing a network structure of an evolved universal mobile telecommunication system (E-UMTS) according to an aspect of the invention.

FIG. 3 shows a network structure of the E-UMTS to which an embodiment of the present invention is applied. The E-UMTS system is an evolved version of the conventional WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network", the entire contents of which are incorporated by reference.

As shown in FIG. 3, the E-UMTS mainly includes a User Equipment (UE), a base station (or eNB or eNode B), and an Access Gateway (AG) which is located at an end of a network (E-UTRAN) and which is connected to an external network. Generally, an eNB can simultaneously transmit multiple data streams for a broadcast service, a multicast service and/or a unicast service. The AG can be divided into a part that processes user traffic and a part that handles control traffic. The AG part for processing new user traffic and the AG part for processing control traffic can communicate with each other using an interface. One or more cells may exist for one eNB.

An interface for transmitting user traffic or control traffic can be used between eNBs. A Core Network (CN) may include the AG and a network node or the like for user registration of the UE. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

Figure 4:
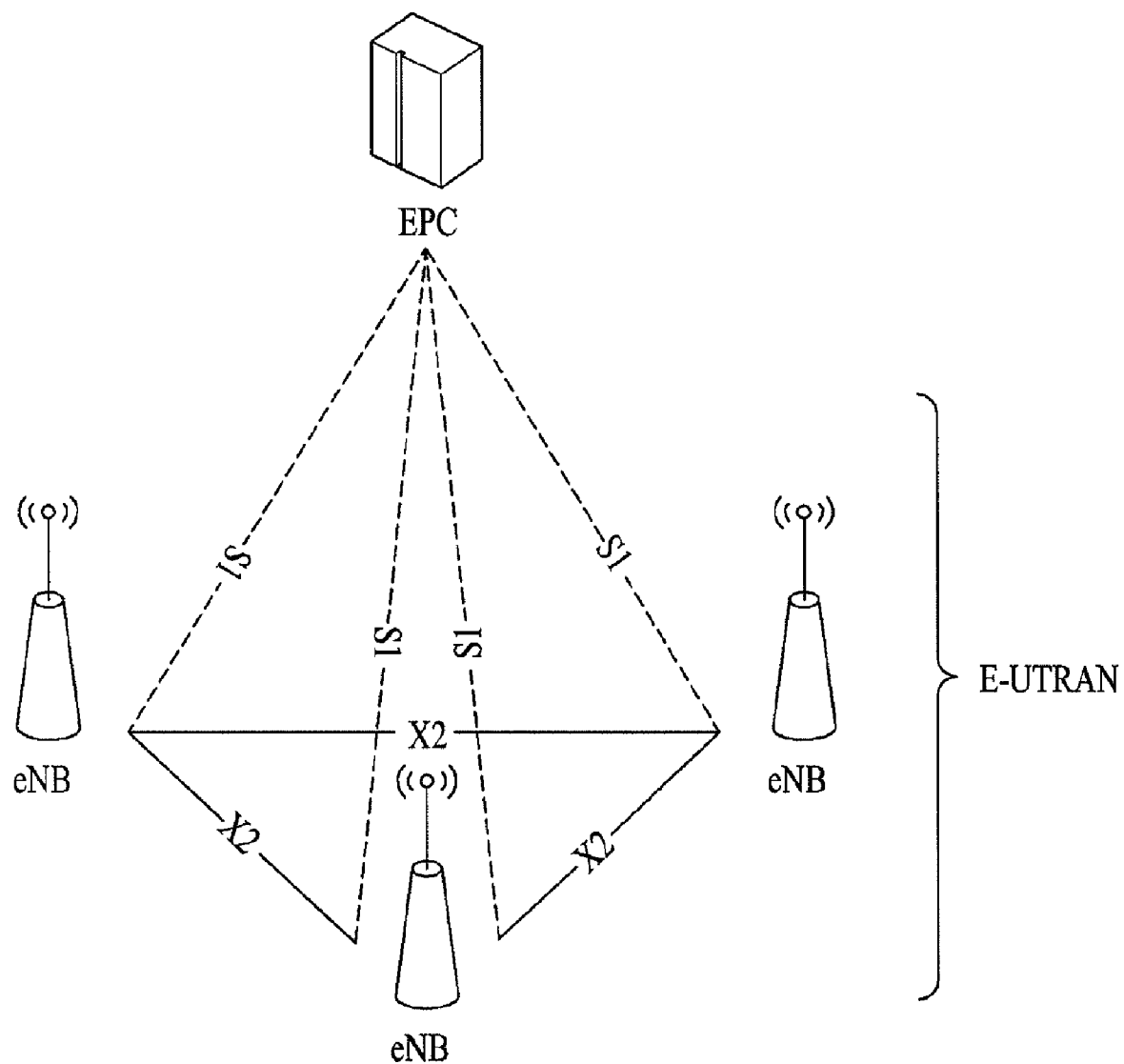
FIG. 4 is a schematic view showing the configuration of an evolved universal terrestrial radio access network (E-UTRAN) according to an aspect of the invention.

FIG. 4 illustrates a network structure of an Evolved Universal Terrestrial Radio Access Network (E-UTRAN) system which is a mobile communication system to which the embodiment of the present invention is applied. The E-UTRAN system is an evolved version of the conventional UTRAN system. The E-UTRAN includes a base station that will also be referred to as "eNode B" or "eNB". The eNBs are connected through an X2 interface. Each eNB is connected to the User Equipment (UE) through a radio interface and is connected to an Evolved Packet Core (EPC) through an S1 interface.

Figure 5A:
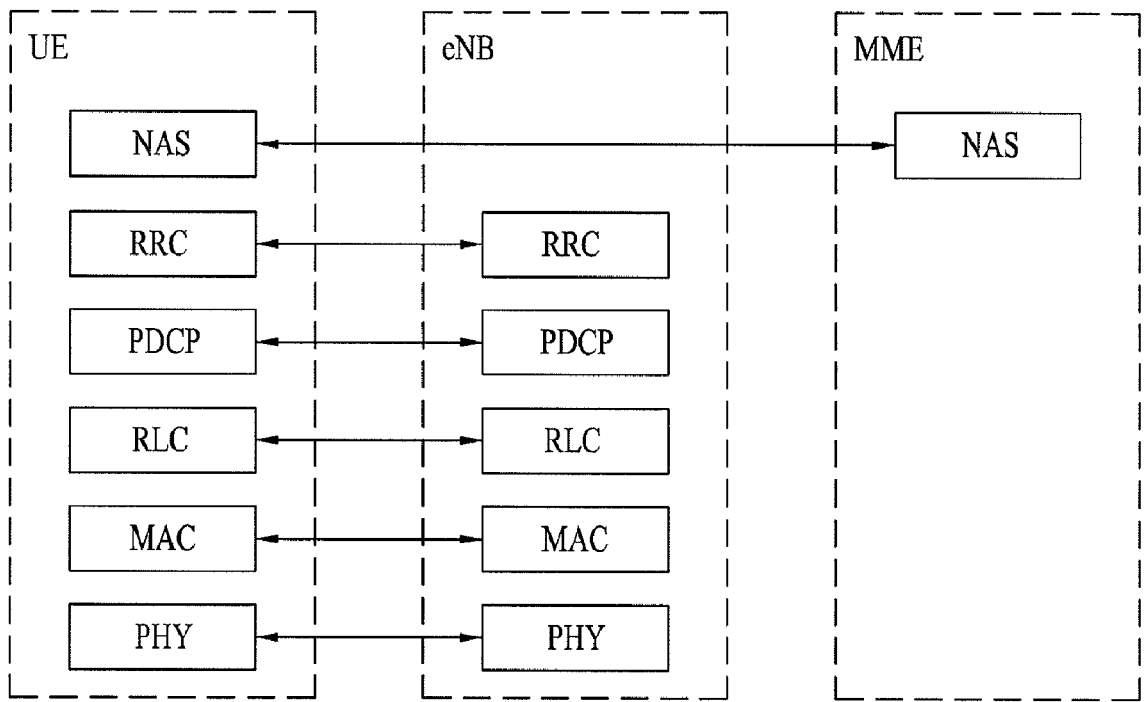
FIGS. 5A and 5B illustrate the configurations of a control plane and a user plane of a radio interface protocol between a UE and an E-UTRAN according to an aspect of the invention.
Figure 5B:
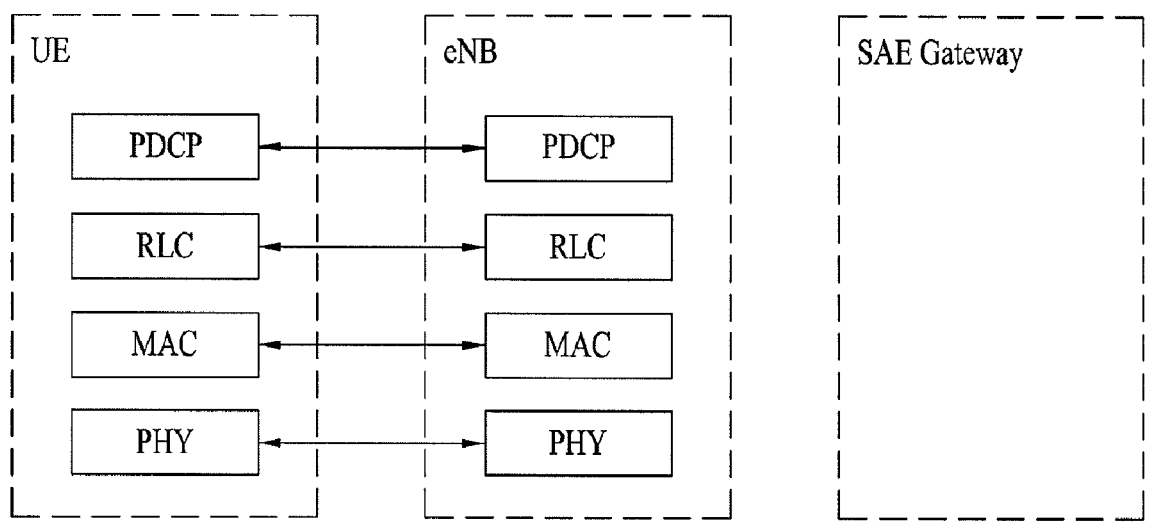

FIGS. 5A and 5B illustrate the configurations of a control plane and a user plane of a radio interface protocol between a UE and a UMTS Terrestrial Radio Access Network (UTRAN) based on the 3GPP radio access network standard. The radio interface protocol is divided horizontally into a physical layer, a data link layer and a network layer, and vertically into a user plane for data transmission and a control plane for signaling. The protocol layers of FIGS. 5A and 5B can be divided into a L1 layer (first layer), a L2 layer (second layer) and a L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports data transmission with reliability. The functions of the RLC layer may also be implemented through internal functional blocks of the MAC layer. In this case, the RLC layer need not exist. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the lowermost of the third layer is defined only in the control plane and is responsible for control of logical, transport, and physical channels in association with configuration, re-configuration and release of Radio Bearers (RBs). The RB is a service that the second layer provides for data communication between the UE and the UTRAN. To accomplish this, the RRC layer of the UE and the RRC layer of the network exchange RRC messages. The UE is in RRC connected mode if RRC connection has been established between the RRC layer of the radio network and the RRC layer of the UE. Otherwise, the UE is in RRC idle mode.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to various UEs. Here, different cells may be set to use different bandwidths.

Downlink transport channels for transmission of data from the network to the UE include a Broadcast Channel (BCH) for transmission of system information, a Paging Channel (PCH) for transmission of paging messages and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH) and a Multicast Traffic Channel (MTCH).

Figure 6:
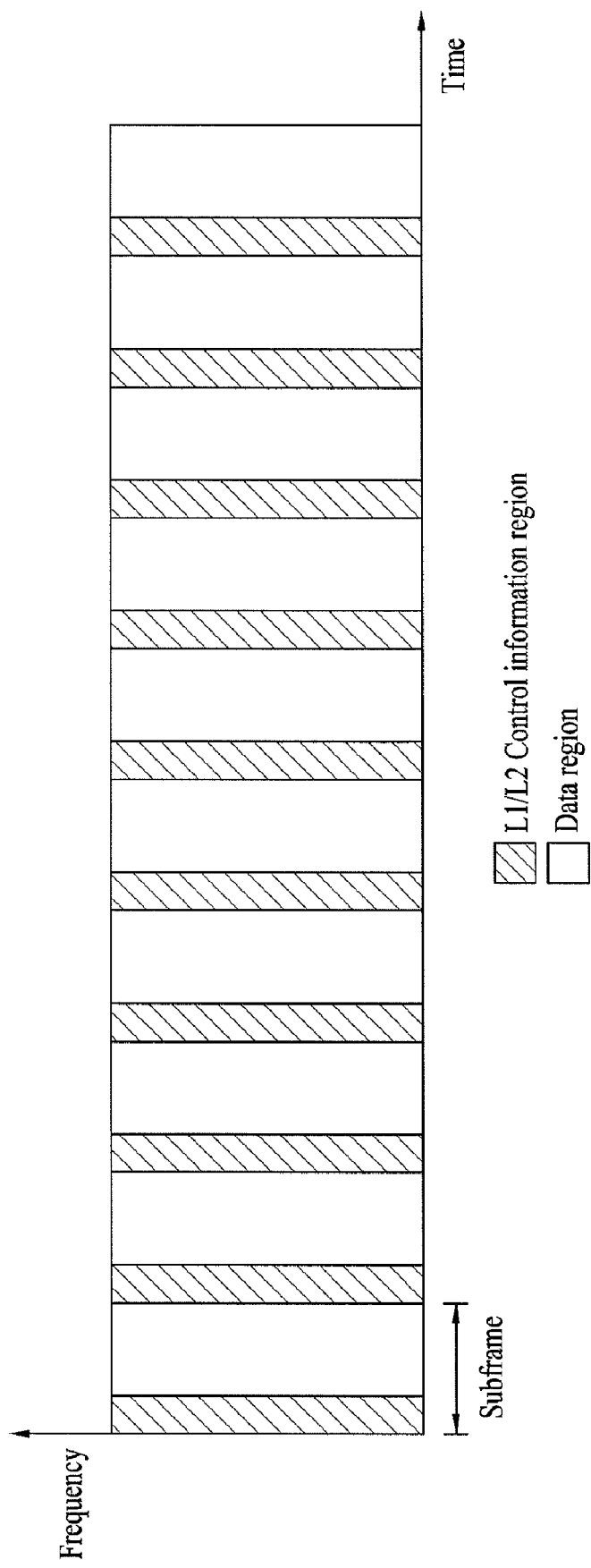
FIG. 6 is a view showing an example of a physical channel structure used in an E-UMTS system according to an aspect of the invention.

FIG. 6 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 6, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) 'A' and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 7:
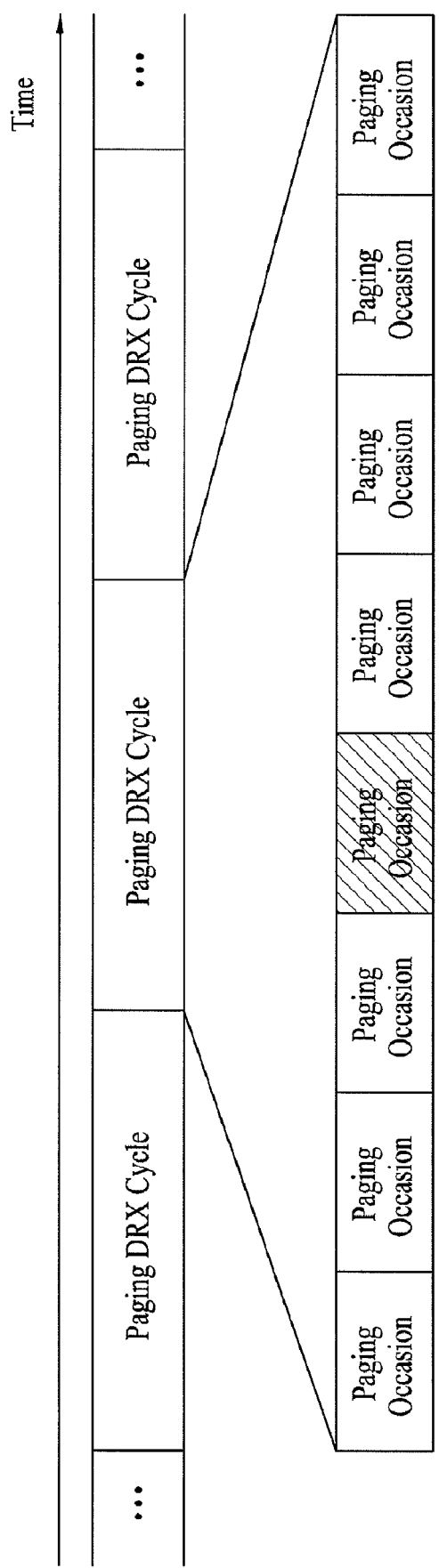
FIG. 7 is a view showing an example of a method of transmitting/receiving a paging message according to an aspect of the invention.

FIG. 7 is a view showing an example of a method of transmitting/receiving a paging message. The paging message includes a paging record including a paging cause and a UE identity. When receiving the paging message, the UE may perform discontinuous reception (DRX) for the purpose of reducing power consumption. In more detail, a network configures several paging occasions in every cycle called a paging DRX cycle and a certain UE receives only a certain paging occasion and acquires a paging message. In an occasion except a certain paging occasion, the UE does not receive a paging channel and may transit to a sleep mode in order to reduce power consumption. One paging occasion corresponds to one TTI. The base station and the UE use a paging indicator (PI) as a certain value for notifying that the paging message is transmitted. The base station may define a certain identity (e.g., paging-radio network temporary identity (P-RNTI)) as the PI and notify the UE that the paging information is transmitted. For example, the UE awakes in every DRX cycle and receives one subframe in order to know whether or not the paging message is present. If the P-RNTI is included in the L1/L2 control channel (PDCCH) of the received subframe, the UE can know that the paging message is included in the PDSCH of the subframe. In addition, if the identity (e.g., the IMSI) of the UE is present in the paging message, the UE responds (e.g., RRC connection) to the base station and receives the service.

Figure 8:
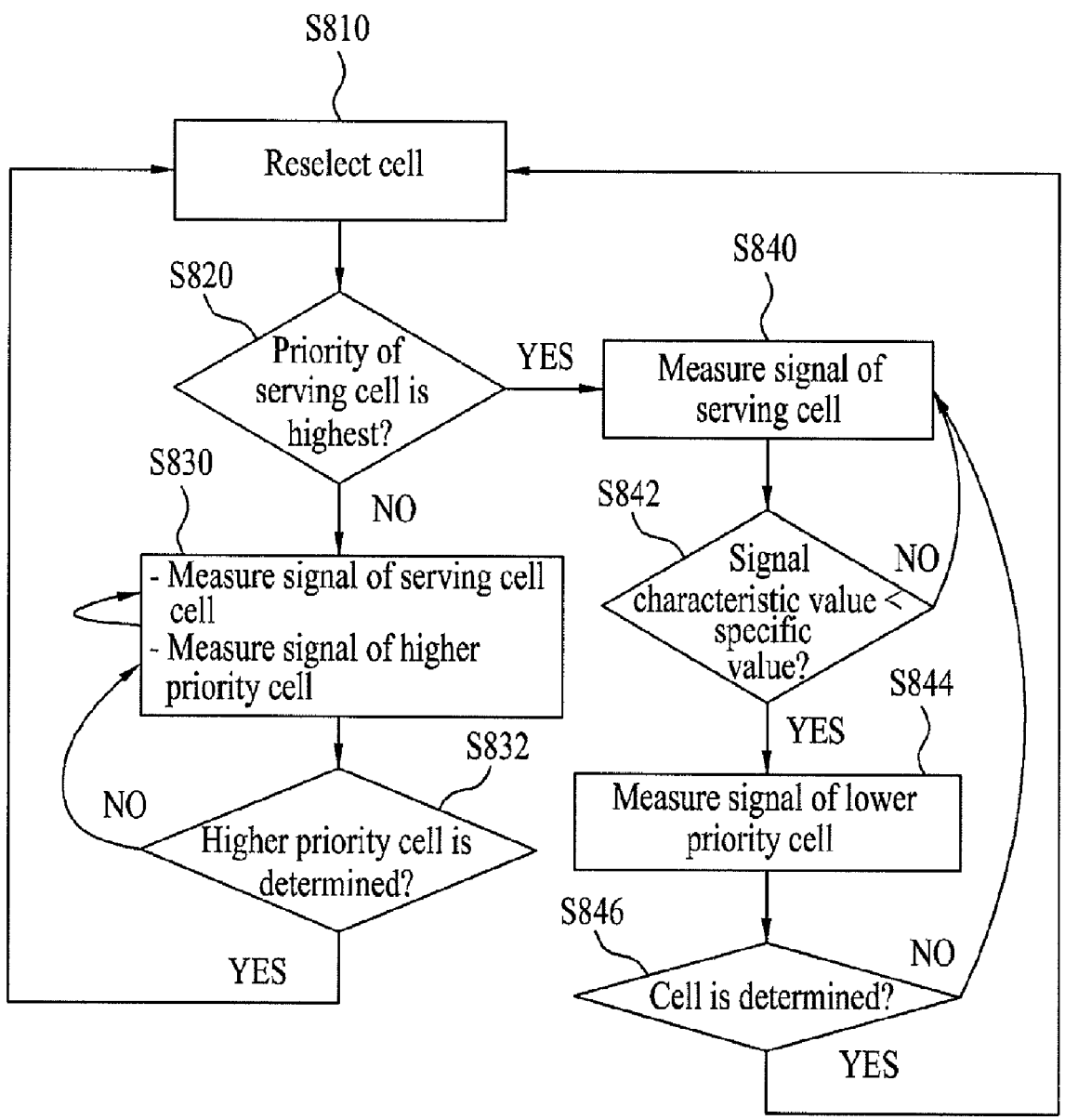
FIG. 8 is a view showing a method of, at a UE in an idle mode, reselecting a cell according to a priority according to an aspect of the invention.

FIG. 8 is a view showing one method of reselecting a cell according to priority. In FIG. 8, the priority is defined per frequency or RAT. If the priorities are defined with respect to different frequencies or RATs, the UE selects a cell corresponding to a frequency or RAT having a high priority once the cell satisfies a minimum signal characteristic value (minimum value) or a certain signal characteristic value (threshold value) defined in the system. Exceptionally, the UE may select a cell having a highest signal characteristic value without considering the priority at the time of initial cell selection.

In FIG. 8, if the UE selects a cell having a highest priority and receives the service (S820) and the signal characteristic value of the cell (serving cell) which provides the service is equal to or greater than a certain value (e.g., $S_{nonintrasearch}$), the measurement of a cell having a low priority may not be performed and thus power consumption can be efficiently reduced (S840 and S842). In contrast, if the signal characteristic value of the serving cell is reduced to a certain value or less although the priority of the serving cell is highest, the UE may select another cell having a low priority and that satisfies the certain signal characteristic value by the measurement process (S844 and S846). If a plural number of cells satisfy the certain value, a cell satisfying a certain criterion (e.g., a cell having a highest priority, a cell having a highest signal characteristic value or the like) may be selected from the plural number of cells (S846).

In contrast, if the UE does not select the cell using the frequency and/or RAT having the highest priority so as to receive the service (that is, the cell having a low priority is selected) (S820), although the signal characteristic value of the serving cell is equal to or greater than the certain value (e.g., $S_{nonintrasearch}$), the UE periodically searches for the cell using the frequency and/or RAT having a high priority (S830 and S832). The period for searching for another cell may be jointly decided between the base station and the UE, or may be decided by any one of the base station or the UE and notified to the other node.

Hereinafter, a cell reselection process according to a priority will be described in detail.

First, when the UE reselects another cell having the same priority as the serving cell, the UE reselects a cell having a highest signal characteristic value by a ranking process of comparing the intensity and quality of the signal. The equation which is used for the ranking process between the cells having the same priority is as follows.

$$R_s = Q_{meas,s} + Qhyst_s$$

$$R_n = Q_{meas,n} - Qoffset$$

where, $Q_{meas,s}$ denotes a reference symbol received power (RSRP) value measured by the UE with respect to the serving cell; and $Q_{meas,n}$ denotes a RSRP value measured by the UE with respect to the neighbor cells.

$Qhyst_s$ denotes a hysteresis value for weighting the serving cell; and

Qoffset denotes at least one of a bias value between cells and a bias value between different frequencies.

In the ranking process, if the cell having the highest signal characteristic value satisfies a criterion Rn>Rs for a certain time $Treselection_{EUTRAN}$, the UE selects a cell corresponding to Rn. That is, a cell having a best signal characteristic is reselected from the cells having the signal characteristic better than that of the serving cell. In the conventional WCDMA, the cell having the highest signal characteristic value is reselected by the above-described ranking process without using the priority information of the frequency or RAT.

The value of Treselection is used to impose a restriction time duration for which the cell reselection criterion should be satisfied in order to prevent the UE from repeatedly selecting a certain cell. And, the value of Treselection is transmitted from the base station to the UE via the SI. In the intra-frequency cell reselection and the inter-frequency cell reselection, a value of $Treselection_{EUTRAN}$ is used. In the inter-RAT cell reselection, $Treselection_{UTRAN}$ is used to reselect a WCDMA cell and $Treselection_{GERAN}$ is used to reselect a GSM cell. That is, the restriction time duration is defined per RAT such that the different restriction times are respectively applied to different RATs. Hereinafter, TreselectionRAT is used for representing the restriction time duration for cell reselection from the serving cell to a target cell, regardless of RAT.

In addition, if the speed of UE is high, in order to rapidly perform the cell reselection, TreselectionRAT which is transmitted via the SI by the base station is applied along with a scaling factor_S (SF_S) which depends on the speed determined by the UE to obtain TreselectionRAT*(=TreselectionRAT×Scaling Factor_S). Then TreselectionRAT* is applied as the restriction time duration for cell reselection. Here, "*" is used for representing the restriction time duration which is finally applied in cell reselection.

Figure 9:
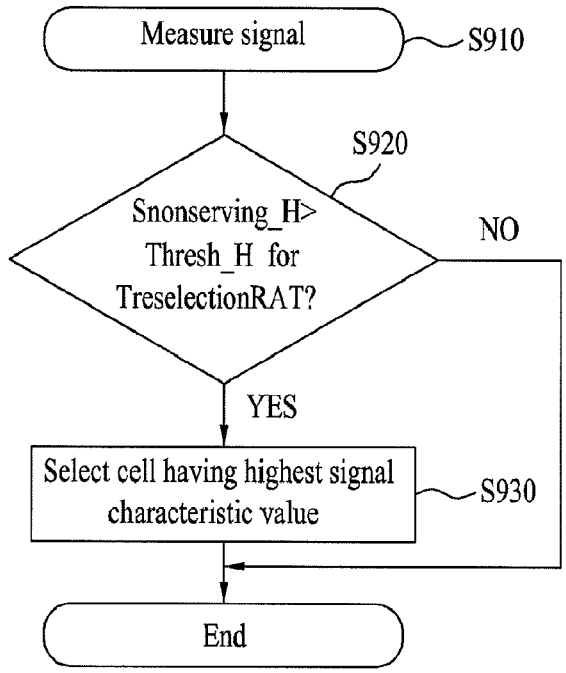
FIG. 9 is a view showing a method of reselecting a cell having a priority higher than that of a serving cell according to an aspect of the invention.

FIG. 9 is a view showing a method of reselecting a cell having a priority higher than that of a serving cell. Referring to FIG. 9, the reselection of the cell using the frequency or RAT having the priority higher than that of the frequency or RAT of the serving cell in the process of FIG. 8 will be described in detail. Referring to FIG. 9, the UE selects a cell satisfying a criterion that a signal characteristic value (e.g., Snonserving_H) of the cell using the frequency or RAT having the priority higher than that of the frequency or RAT of the serving cell is equal to or greater than a certain threshold value (e.g., Thresh_H) for a certain time duration (S910 and S920). At this time, the cell using the frequency or RAT having a highest priority is selected from the cells and, if several cells having the same priority are present, a cell having a highest signal characteristic value is selected according to the ranking process (S930).

Figure 10:
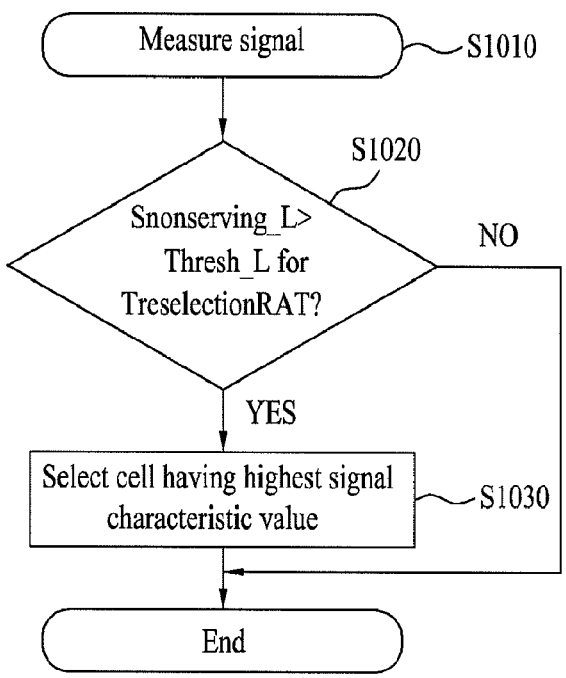
FIG. 10 is a view showing a method of reselecting a cell having a priority lower than that of a serving cell according to an aspect of the invention.

FIG. 10 is a view showing a method of reselecting a cell having a priority lower than that of a serving cell. Referring to FIG. 10, the reselection of the cell using the frequency or RAT having the priority lower than that of the frequency or RAT of the serving cell in the process of FIG. 8 will be described in detail. If the UE does not find the cell having the priority higher than that of the serving cell and the signal characteristic value of the serving cell is less than the certain threshold value (e.g., Sserving<Threshold), the cell using the frequency or RAT having the priority lower than that of the frequency or RAT of the serving cell is reselected. At this time, the UE reselects a cell which satisfies the condition that a signal characteristic value (e.g., Snonserving_L) of cells corresponding to a frequency or RAT of a lower priority than the serving cell is equal to or greater than a certain threshold value (e.g., Thresh_L) for a specific time TreselectionRAT (S1010 to S1030).

The criterion for determining the priority according to the frequency or radio access technology by the network satisfies the following criteria. The following objects may be considered as the case where the cell selection process of the UE is necessary.

Criteria 1—QoS provided to the UE: It is indicated that the priority is set according to the quality or the type of the service which will be provided to the UE. For example, with respect to the UE using only a Voice over Internet Protocol (VoIP), a high priority may be set to the frequency or RAT associated with the VoIP. Alternatively, with respect to the UE using a service requiring a high data rate, a high priority may be set to the RAT for providing a high data rate (e.g., E-UTRAN). In addition, with respect to the UE using a Multimedia Broadcast Multicast Service (MBMS), a high priority may be set to the frequency or RAT for providing the MBMS.

Criteria 2—Network sharing: It is indicated that different PLMNs are shared such that a service is provided to the UE. The priority of the frequency or RAT may be decided such that the UE selects a cell providing an available PLMM.

Criteria 3—Subscriber type: It is indicated that the priority is determined according to Subscriber information. For example, with respect to a user who subscribes a service requiring only voice communication requiring a low rate, a high priority is set to a RAT (e.g., UTRAN) with a low rate and a low priority is set to a RAT (e.g., E-UTRAN) with a high rate. Alternatively, with respect to a user who subscribes a multimedia service requiring a low rate, a high priority is set to a RAT (e.g., E-UTRAN) with a high rate and a low priority is set to a RAT (e.g., UTRAN) with a low rate.

Criteria 4—Closed subscriber group (CSG) or Home NodeB: A CSG cell indicates a cell which is available by one or more certain users or UEs. With respect to a certain UE which can access the CSG cell, a high priority may be set to the frequency or RAT associated with the CSG. The home node which is used by the user at home may be an example of the CSG.

Criteria 5—Load balancing: The camp/traffic load balancing is included. For example, a high priority is set to the frequency or RAT having a low load such that the UE preferentially selects a cell having a low load and receives a service, thereby achieving load balancing between the cells. The load balancing is achieved in the unit of cells, tracking areas, registration areas each including a plurality of tracking areas, or PLMNs, according to the range of the area to which the priority of the frequency or RAT is applied.

Criteria 6—Operator policy: In addition to the above-described criteria, a high priority may be set to a certain frequency or RAT according to the policy of a network operator.

The validity of the priority information associated with the frequency or RAT allocated to the UE and an application range/scope thereof are as follows.

Validity determination 1—The validity of the priority is determined in the unit of tracking areas (TAs) and the priority is not changed before a tracking area update (TAU) process (a process of registering the identity of the UE, such as the IMSI, in the network). For example, in the TAU process, the priority allocated in a previous TAU process may become invalid. If the priority information is received from the network during the TAU process or after the TAU process, the priority becomes valid until a next TAU process.

Validity determination 2—The validity of the priority is determined in the unit of cells and the priority is not changed before another cell is reselected. For example, if the cell which provides the service to the UE is changed, a previously allocated priority may become invalid. If the priority is received from the network via the SI during the cell reselection process or after the cell reselection process, the priority becomes valid until next cell reselection, or before the reception of SI after next cell reselection.

In the above-described validity processes, the validity or the range of the PLMN units may be used.

In the above-described validity processes, the validity or the range of the PLMN registered by the UE (i.e., the registered PLMN (RPLMN) units) may be used.

In addition, the priority information may become invalid while the state of the UE transits from an idle mode to a connected mode. That is, the priority may become invalid by a certain RRC signal for moving the UE from the idle mode to the connected mode. For example, the priority may become invalid when the UE sends RRC connection request, when RRC connection setup is received from the base station or when RRC connection complete is sent to the base station. In contrast, the priority information may become invalid while the state of the UE transits from the connected mode to the idle mode. That is, the priority may become invalid by a certain RRC signal for moving the UE from the connected mode to the idle mode. For example, the priority may become invalid by RRC connection release.

The UE may receive the priority from the base station by at least one of the following methods.

Reception method 1—The selectable frequency/RAT information and the priority information thereof are received from the base station at TAU.

Reception method 2—The selectable frequency/RAT information is received from the base station at TAU. Thereafter, the priority information of a certain frequency/RAT is received via SI.

Reception method 3—The selectable frequency/RAT information and the priority information thereof are received via SI. In addition, the priority information of a neighbor cell may be received via SI together with a neighbor cell list (NCL).

Reception method 4—The frequency/RAT information and the priority information thereof may be received via a RRC signal. The RRC signal may be, for example, the signal associated with RRC connection release, RRC connection request, RRC connection setup, radio bearer setup, radio bearer reconfiguration, RRC connection reconfiguration or RRC connection re-establishment.

Reception method 5—The frequency or RAT information and the priority information thereof may be received via L1/L2 control signaling and packet data convergence protocol (PDCP)/radio link control (RLC)/medium access control (MAC) protocol data unit (PDU).

As noted previously, the UE may receive the priority from the network by at least one of the above-described methods. The priority information of the frequencies or RATs received by different methods may be equal or different.

If the UE repeatedly receives the priority by different methods, the UE may preferentially apply the priority received by one method in place of the priority received by another method. For example, the UE may receive the priority one more time via the RRC connection release after receiving the priority via the SI. In this case, the UE may ignore the priority received from the SI and perform the measurement and the cell reselection according to the priority received via the RRC connection release. Thereafter, the UE in the idle mode may be RRC-connected to the base station in order to receive the service from the base station, and the priority previously received via the RRC connection release may become invalid in this process. In addition, if the UE cannot receive the priority from the network at RRC connection release after receiving the service from the base station, the UE which is returned to the idle mode may perform the cell reselection using the priority before the RRC connection or perform the cell reselection using the priority which is newly received from the SI.

When the UE determines the priority of the frequency/RAT, the UE knows whether or not the frequency or RAT is present from the NCL received via the SI. The UE may then perform the cell reselection using the priority of each cell after receiving the priority of each cell from the base station or deciding the priority of each cell using the NCL and the priority of the frequency/RAT. In addition, the UE may perform a scanning process without the NCL and detect whether or not another frequency or RAT is present.

An Embodiment of the Invention

Differentiation of the Cell Reselectability According to the Priority

Generally, cell reselection according to the priority of the frequency or RAT has the following merits. First, if an absolute priority is used for cell reselection, the signal measurement/cell reselection rule and attendant software is simplified. Second, when the UE selects a cell using a frequency or RAT of a highest priority, and when the cell satisfies a certain criterion (e.g., S_intra_frequency), other frequencies or RATs are not measured and thus power consumption is reduced.

However, if the UE does not select the cell using the frequency or RAT of a high priority, the UE continuously measures a cell having a high priority and the QoS is not ensured. Accordingly, in order to enjoy the merits of the cell reselection according to the priority, it is necessary to enable the UE to readily select the cell having the high priority.

Accordingly, the present invention provides a novel and useful method for differentiating cell reselectability according to the priority. The method includes the steps of: measuring a signal of a candidate cell; and selecting the candidate cell when the signal characteristic of the candidate cell satisfies a certain criterion for a certain time duration, wherein the certain time duration is modified according to a priority of the candidate cell.

The priorities are related to a UE frequency, a UE radio access technology (RAT) or a combination thereof. The criteria for determining the priority by the network, the validity and the range/scope of the priority information allocated to the UE, and the method of receiving the priority information from the network were described in detail above. Preferably, satisfaction of the certain criterion is determined depending on whether a signal characteristics value of the candidate cell is equal to or greater than a certain threshold value. Preferably, the certain time duration is a restriction time duration for cell reselection (Treselection).

Figure 11:
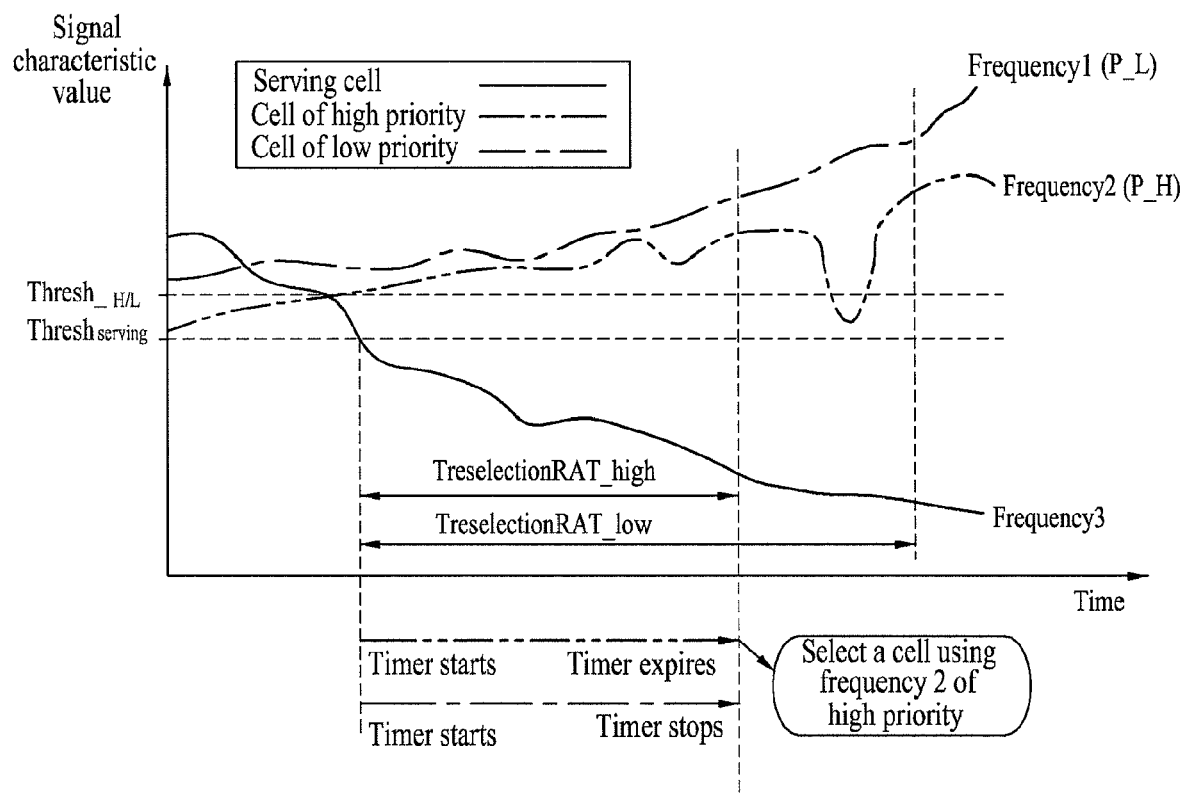
FIG. 11 is a conceptual diagram of cell reselection according to an embodiment of the present invention.

Differentiation of the Restriction Time Duration for Cell Reselection According to the Priority FIG. 11 is a conceptual diagram of cell reselection according to an embodiment of the present invention. As shown in FIG. 11, a UE receives a service from a serving cell using a frequency 3. The UE performs a cell search in order to perform cell reselection. The cell reselection is performed while the signal characteristic value of the serving cell is reduced to a value of $Thresh_{serving}$ or less (e.g., due to the movement of the UE). Assuming a cell using a frequency 1 and a cell using a frequency 2 exist in the boundary of the serving cell, the UE starts the signal measurement of the two cells. That is, the two cells become candidate cells for cell reselection. In this example, the priority of the frequency 1 is lower than that of the frequency 2. The priority of the frequency of the serving cell may be equal to that of any one of the frequency 1 or the frequency 2, or may be between the priorities of the frequency 1 and the frequency 2.

Both the signal characteristic values of the cell using the frequency 1 and the cell using the frequency 2 are equal to or greater than a certain threshold value Thresh_H/L when the UE starts the signal measurement with respect to the candidate cells. Accordingly, the UE operates a first timer with respect to the cell of the frequency 1 and monitors a time duration for which the signal characteristic value satisfies Thresh_L. In addition, the UE operates a second timer with respect to the cell of the frequency 2 and monitors a time duration for which the signal characteristic value satisfies Thresh_H.

Because the priority of the frequency 1 is lower than that of the frequency 2, the UE sets different expiration times for the first timer and the second timer (i.e., first timer: TreselectionRAT_low, second timer: TreselectionRAT_high). Specifically, the UE sets the expiration time of the first timer for the cell of the low priority to be longer than that of the second timer. If more candidate cells which are selectable by the UE are present, the UE may set the timers of these cells individually or per group in consideration of the priorities of the candidate cells.

If the timers are individually set, the UE sets the expiration time of the timer for each candidate cell according to the priority. Thus, timers are become longer for cells having a lower priority.

If the timers are set per group, the UE divides the candidate cells into groups based on the priority of the candidate cell relative to the priority of the serving cell. That is, the candidate cells are divided into a) cells having a priority higher than that of the serving cell, b) cells having a priority equal to that of the serving cell, and c) cells having a priority lower than that of the serving cell. Based on this division, the expiration times of the timers of the candidate cells of the same relative priority may be set to be equal. This will be described in detail with reference to FIG. 12.

Figure 1:
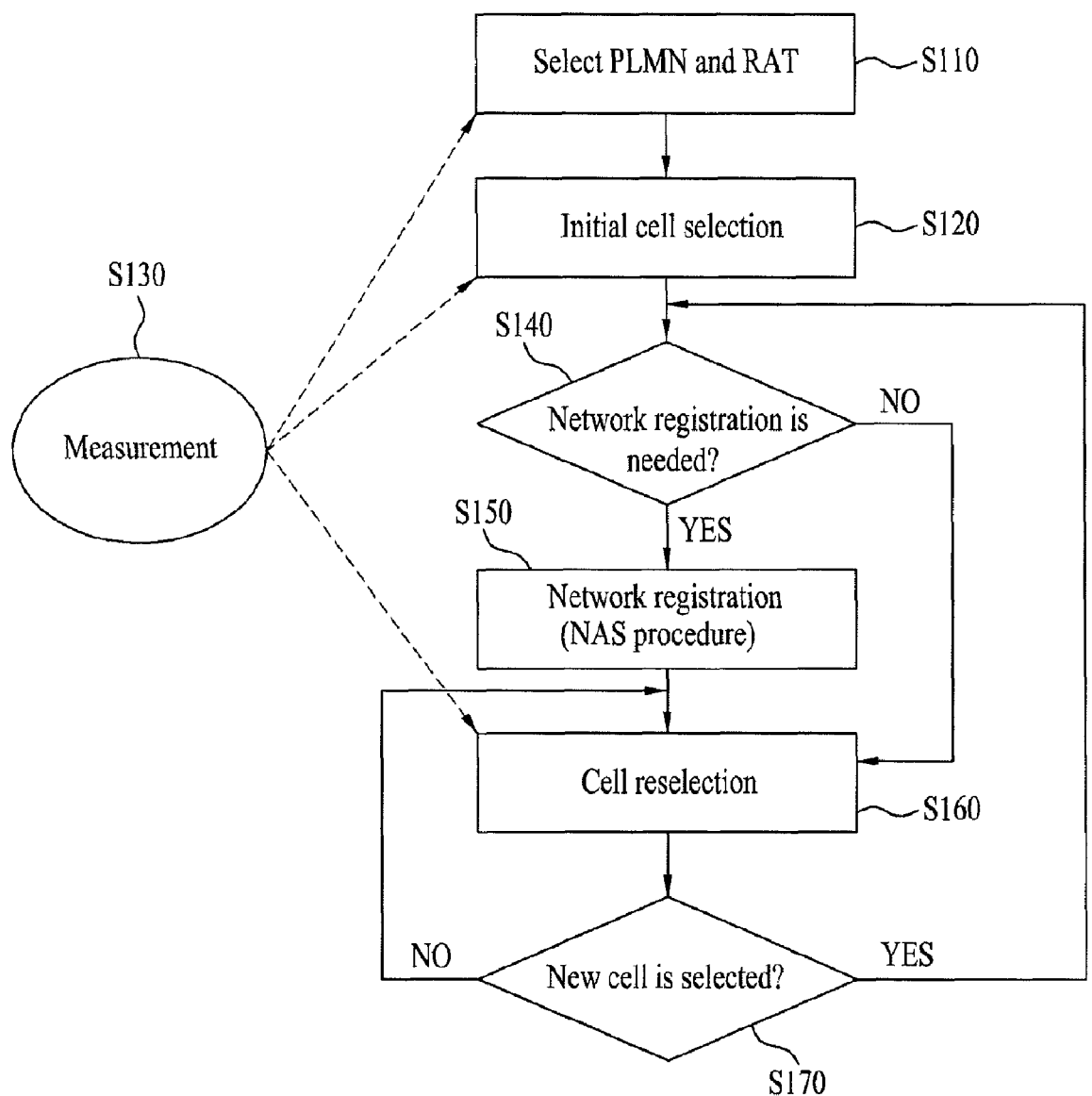
FIG. 1 is a view showing a conventional process of, at a user equipment (UE), selecting a cell in an idle mode.
Figure 2:
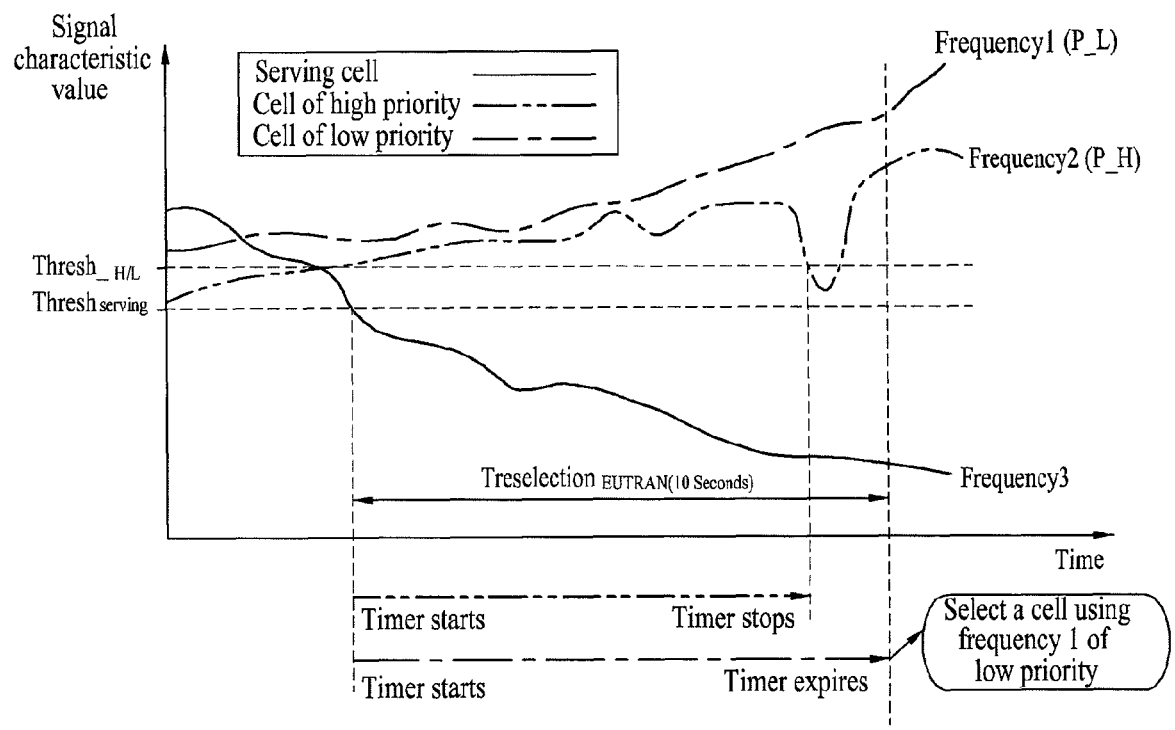
FIG. 2 is a timing diagram in conventional cell reselection.

Because the first timer and the second timer may be simultaneously started but the expiration time of the second timer is shorter than that of the first timer, the second timer is first expired. Because the signal characteristic value of the cell using the frequency 2 is satisfied until the second timer expires, the UE stops the first timer and reselects the cell of the frequency 2. By comparing FIG. 12 to FIG. 2, it can be seen that the cell using the frequency 2 of the high priority is not conventionally selected due to radio fluctuation in the same criterion. In contrast, in the embodiment of the present invention, the cell of the high priority may be readily reselected by varying the length of the restriction time duration applied to the cell of the high priority. That is, it is sufficient that the restriction time duration of the cell of the high priority is relatively shorter than the cell of the low priority. And, an absolute length of each restriction time duration is not set and may be suitably determined in consideration of the wireless environment and the mobility of the UE.

In another embodiment, to maintain backward compatibility with the conventional systems, only the time duration applied to the cell of the high priority may be set to be shorter than the conventional restriction time duration. Alternatively, only the restriction time duration applied to the cell of the low priority may be set to be longer than the conventional restriction time duration.

Figure 12:
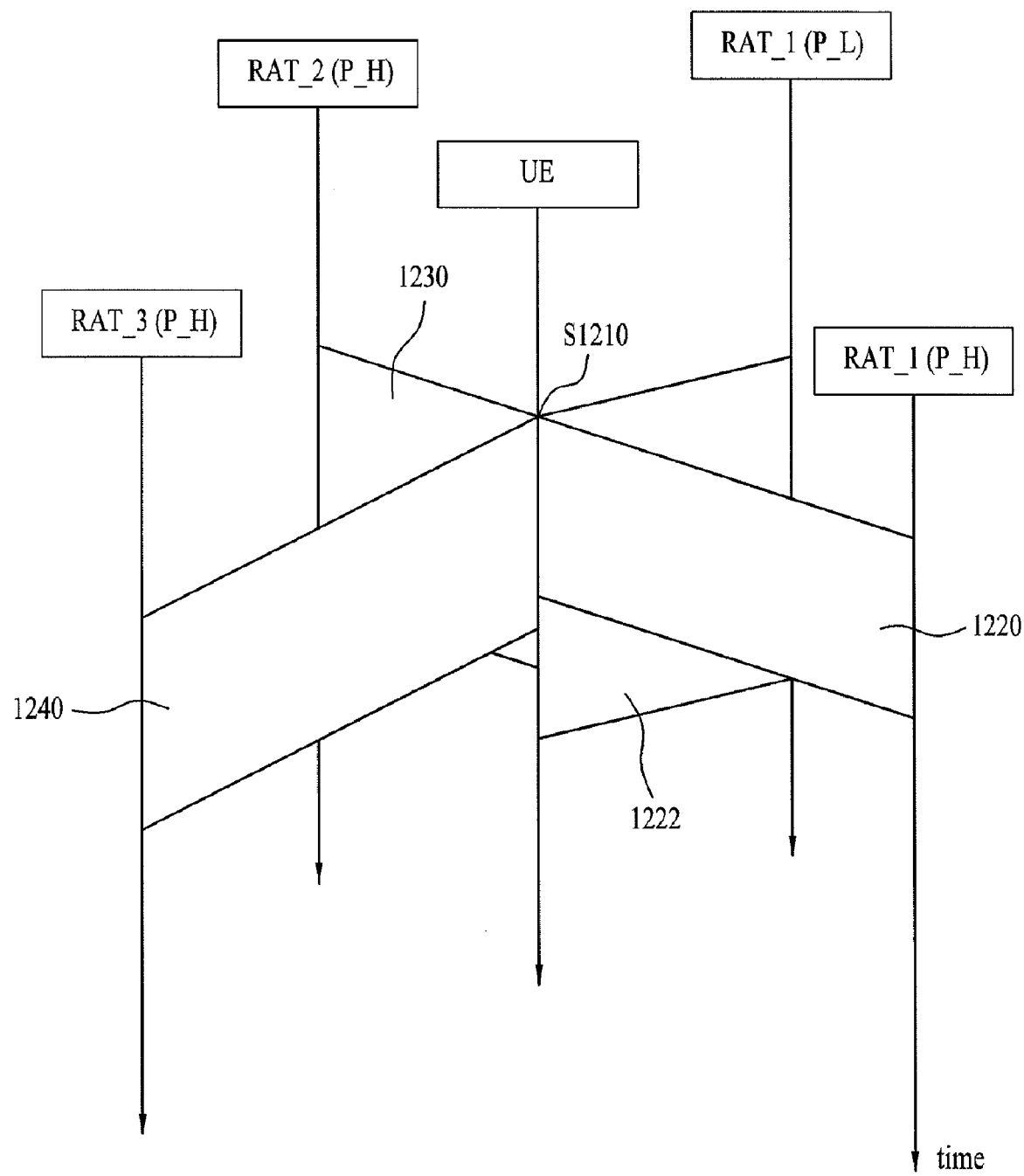
FIG. 12 is a timing diagram in cell reselection according to an embodiment of the present invention.

Differentiation of the Restriction Time Duration for Cell Reselection According to the Relative Priority FIG. 12 is a timing diagram for cell reselection according to an embodiment of the present invention.

Referring to FIG. 12, a UE starts the signal measurement of the candidate cells when a cell reselection process starts (S1210). In FIG. 12, four candidate cells are shown. The candidate cells are denoted by RAT_1(P_H), RAT_1(P_L), RAT_2(P_H) and RAT_3(P_H) based on the RAT. The RAT may be selected from an EUTRAN, a UTRAN, a GSM/EDGE radio access network (GRRAN), a CDMA_HRPD and a CDMA_1×RTT. The priorities of the candidate cells are denoted by P_L or P_H. P_L indicates that the priority is low and P_H indicates that the priority is high. That is, the priorities shown in FIG. 12 are the relative priorities of the candidate cells determined based on the priority of the serving cell. In the previous step of determining the relative priorities, the absolute priorities of the cells are determined according to the frequency, the RAT or the combination thereof.

In FIG. 12, the restriction time duration for cell reselection includes first and second certain time durations determined based on the following criteria, and the lengths of the restriction time durations are set such that the first certain time duration<the second certain time duration:

Criteria 1—the first certain time duration: the priority of the candidate cell is higher than that of the serving cell; and Criteria 2—the second certain time duration: the priority of the candidate cell is lower than that of the serving cell.

In addition, the restriction time duration for cell reselection includes first to third certain time durations determined based on the following criteria, and the lengths of the time durations are set such that the first certain time duration<the second certain time duration≦the third certain time duration, or the first certain time duration≦the second certain time duration<the third certain time duration:

Criteria 1—the first certain time duration: the priority of the candidate cell is higher than that of the serving cell;

Criteria 2—the second certain time duration: the priority of the candidate cell is equal to that of the serving cell; and Criteria 3—the third certain time duration: the priority of the candidate cell is lower than that of the serving cell.

In FIG. 12, RAT_1(P_H) and RAT_1(P_L) using the same RAT will be described. Since the two cells use the same RAT, the priorities thereof are determined by the priority of the frequency. Since the priority of the cell of RAT_1(P_H) is higher than that of the cell of RAT_1(P_L), the restriction time duration (1220) of the cell of RAT_1(P_H) is set to be shorter than the restriction time duration (1222) of the cell of RAT_1(P_L). For example, if RAT_1 is EUTRAN, the restriction time duration may be denoted by $$Treselection_{EUTRAN\_}high\ (1220;\ e.g.,\ 10\ seconds) < Treselection_{EUTRAN\_}low\ (1222;\ e.g.,\ 14\ seconds),$$

Next, the cell of RAT_2(P_H) and the cell of RAT_3(P_L) will be described. The cells shown in FIG. 12 are different from each other in the RAT. One of RAT_1, RAT_2 or RAT_3 may be equal to the RAT of the serving cell. If the RATs used by the cells are different, the priorities of the cells are determined by the RAT or the combination of the RAT and the frequency priority. For example, the serving cell may be {EUTRAN, frequency_1, priority: 2} and the candidate cells may be {UTRAN, frequency_2, priority: 1} and {UTRAN, frequency_3, priority: 3}. Because the cell of RAT_1(P_H), the cell of RAT_2(P_H) and the cell of RAT_3(P_L) have the high priorities, the restriction time duration for cell reselection may be set to be shorter than that of the cell of the low priority. However, because the cells are different in the used RAT, the restriction time durations for cell reselection applied to the cells may be basically different from one another. For example, if it is assumed that RAT_1 is EUTRAN, RAT_2 is UTRAN and RAT_3 is GERAN, the restriction time durations for cell reselection applied to the cells are as follows.

If different RATs are used:

$$Treselection_{EUTRAN\_}high\ (1220) < Treselection_{GERAN\_}high\ (1240) < Treselection_{UTRAN\_}high\ (1230)$$

If the same RAT is used:

$$Treselection_{EUTRAN\_}high\ (1220) < Treselection_{EUTRAN\_}low\ (1222)$$

$$Treselection_{UTRAN\_}high\ (1230) < Treselection_{UTRAN\_}low\ (not\ shown)$$

$$Treselection_{GERAN\_}high\ (1240) < Treselection_{GERAN\_}low\ (not\ shown)$$

Cell Reselection Process of the UE According to the Differentiated Restriction Time Durations The following factors may be considered in order to differentiate the restriction time duration according to the priority.

Factor 1—A plurality of restriction time durations which is differently set according to the priority is used Factor 2—One basic restriction time duration is set and one or more scaling factors (SFs) to be multiplied with the basic restriction time duration are set.

The plurality of restriction time durations or the basic restriction time duration may be differently set per RAT. In addition, in order to discriminate between the SF applied according to the priority and another SF (e.g., SF_S considering mobility), the SF applied according to the priority is denoted by SF_P. The SF_P may be differently set per frequency or RAT.

Hereinafter, a method of performing the cell reselection using the restriction time durations differentiated according to the priority will be described with reference to FIGS. 13 to 15.

Figure 13:
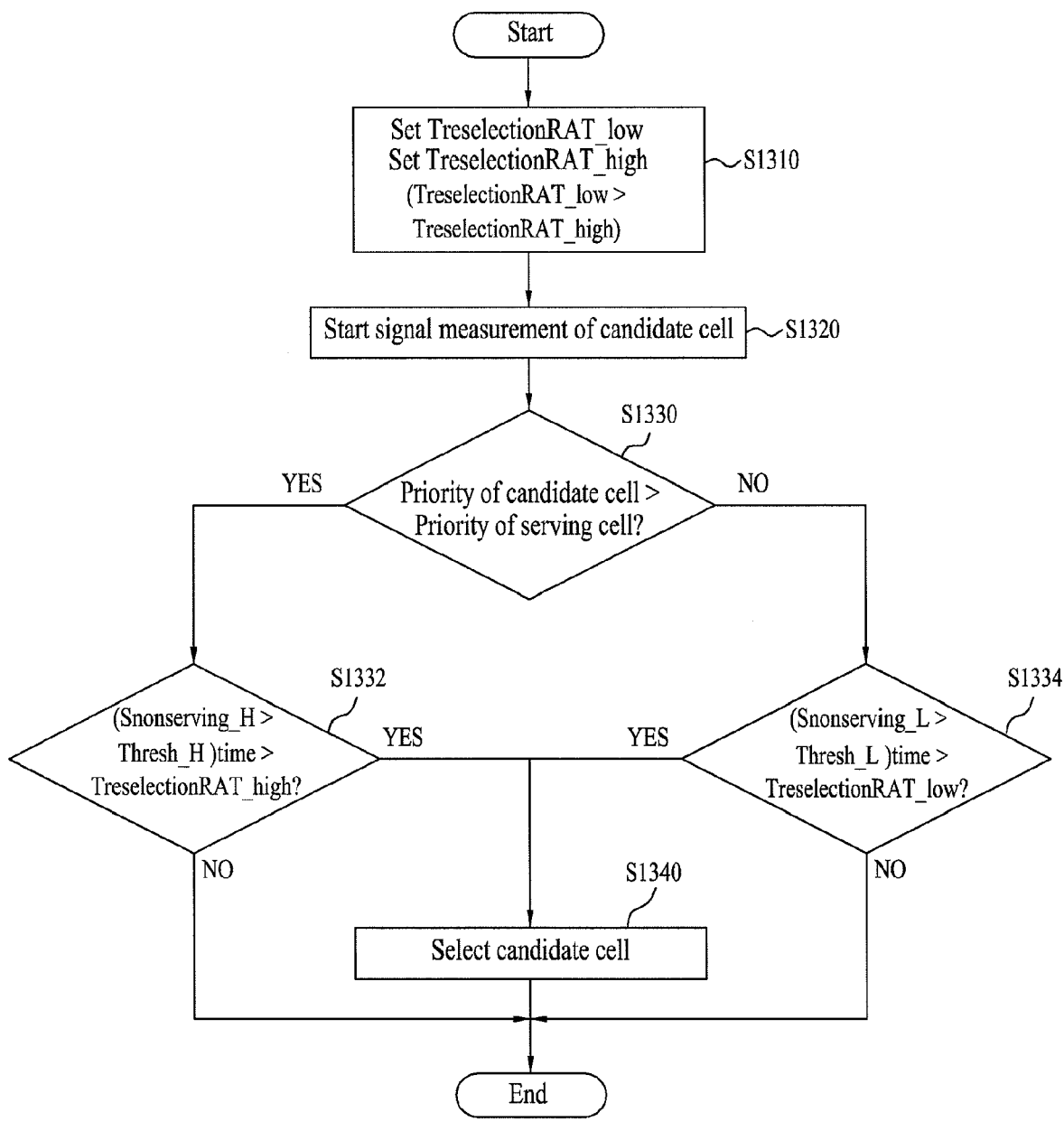
FIG. 13 is a flowchart illustrating cell reselection according to an embodiment of the present invention.

Case 1: The plurality of restriction time durations which is differently set according to the priority is used:

FIG. 13 shows the case where the restriction time durations for cell reselection are individually set according to the priority. In FIG. 13, the UE sets TreselectionRAT_high and TreselectionRAT_low as the restriction time durations differentiated according to the priority (S1310). The restriction time duration may be further modified in consideration of the mobility of the UE. For example, the restriction time duration that is actually applied to the cell reselection may be modified as follows in consideration of the mobility of the UE.

$$Treselection_{EUTRAN\_}high^* = Treselection_{EUTRAN\_}high \times SF\_S$$

$$Treselection_{EUTRAN\_}low^* = Treselection_{EUTRAN\_}low \times SF\_S$$

where, "*" denotes the restriction time duration which is finally applied at cell reselection and SF_S denotes the scaling factor considering the mobility of the UE. If such additional element as SF_S is not considered, $Treselection_{EUTRAN\_}high^* = Treselection_{EUTRAN\_}high$ and $Treselection_{EUTRAN\_}low^*w = Treselection_{EUTRAN\_}low$.

If the cell reselection is started, the UE starts to measure the signal of the candidate cell (S1320). The signal measurement process is continuously performed until the cell reselection process is finished. In the actual cell reselection process, the signal characteristic value obtained from the measured signal is used. Examples of the signal characteristic value include a reference symbol received power (RSRP), a reference symbol received Quality (RSRQ) and a received signal strength indicator (RSSI).

While the signal of the candidate cell is measured, the UE determines whether the priority of the candidate cell is higher than the serving cell (S1330). Thereafter, the UE determines whether or not the candidate cell satisfies the criterion for the cell reselection in consideration of the relative priority of the candidate cell (S1332 and S1334). If the UE determines that none of the candidate cells satisfy the criterion, the process ends. If the UE determines that one of the candidate cells satisfies the criterion, the UE selects that candidate cell (S1340) and the process ends. The criterion for the cell reselection is as follows according to the relative priority of the candidate cell.

Criteria 1—Candidate cell having a higher priority than the serving cell:

$$(Snonserving\_H > Thresh\_H)_{satisfaction\_time} >$$
$$TreselectionRAT\_high* = TreselectionRAT\_high$$

Criteria 2—Candidate cell having a priority equal to or lower than that of the serving cell:

$$(Snonserving\_L > Thresh\_L)_{satisfaction\_time} >$$
$$TreselectionRAT\_low* = TreselectionRAT\_low$$

where, Snonserving_H and Snonserving_L each denotes a corresponding signal characteristic value of the candidate cell and Thresh_H and Thresh_L each denotes a corresponding a threshold value that the signal characteristic value of the candidate cell should satisfy.

For example, if the RAT of the candidate cell is EUTRAN, the restriction time duration may be set to $Treselection_{EUTRAN}\_high=10$ seconds; and $Treselection_{EUTRAN}\_low=14$ seconds. In other embodiments, other values may be used.

In FIG. 13, candidate cells having the priority equal to or lower than the serving cell are equally treated. However, separate restriction time duration may be defined with respect to the candidate cell having the priority equal to the serving cell. For example, the following criterion may be added to FIG. 13. In this case, the flowchart may be modified accordingly.

Criteria 1: Candidate cell having the priority equal to the serving cell $$(Snonserving\_E > Thresh\_E)_{satisfaction\_time} >$$
$$TreselectionRAT\_equal$$

Case 2: The basic restriction time duration and the plurality of SF_Ps are used

Figure 14:
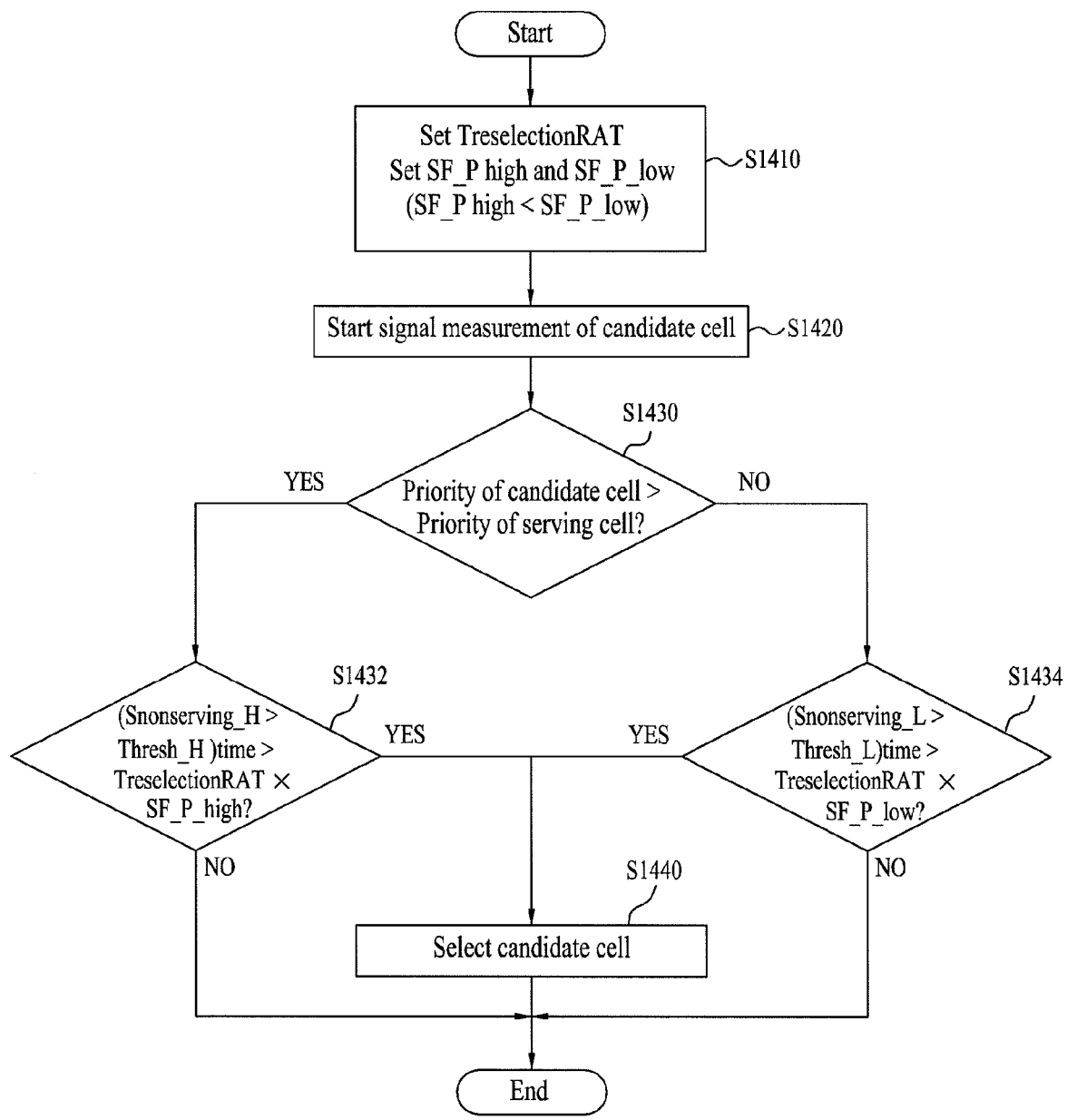
FIG. 14 is a flowchart illustrating cell reselection according to another embodiment of the present invention.

FIG. 14 shows process for using a plurality of scaling factors_P (SF_P) that are applied according to the priority and the restriction time duration set per RAT. In order to simplify the operation of the system, the UE may use only two types of SF_Ps with respect to the frequency of a high priority and the frequency of a low priority. In addition, only two types of SF_Ps may be used with respect to the RAT of a high priority and the RAT of a low priority. In other embodiments, multiple SF_Ps may be used for the frequencies or RAT of high or low priority.

The UE sets TreselectionRAT, SF_P_high and SF_P_low in order to differentiate the restriction time duration according to the priority (S1410). If the cell reselection is started, the UE starts to measure the signal of the candidate cell (S1420). The signal measurement process is continuously performed until the cell reselection is finished. In the actual cell reselection process, the signal characteristic value obtained from the measured signal is used. Examples of the signal characteristic value include a reference symbol received power (RSRP), a reference symbol received Quality (RSRQ) and a received signal strength indicator (RSSI). While the signal of the candidate cell is measured, the UE determines whether the priority of the candidate cell is higher than the serving cell (S1430). Thereafter, the UE determines whether the candidate cell satisfies the criterion for the cell reselection in consideration of the relative priority of the candidate cell (S1432 and S1434). If the UE determines that none of the candidate cells satisfy the criterion, the process ends. If the UE determines that one of the candidate cells satisfies the criterion, the UE selects the candidate cell satisfying the criterion (S1440). The criterion for the cell reselection is as follows according to the relative priority of the candidate cell.

Criteria 1—Candidate cell having a priority higher than the serving cell:

$$(Snonserving\_H > Thresh\_H)_{satisfaction\_time} >$$
$$TreselectionRAT\_high* = TreselectionRAT \times SF\_P\_high$$

Criteria 2—Candidate cell having a priority equal to or lower than the serving cell:

$$(Snonserving\_L > Thresh\_L)_{satisfaction\_time} >$$
$$TreselectionRAT\_low* = TreselectionRAT \times SF\_P\_low$$

where, Snonserving_H/L denotes the signal characteristic value of the candidate cell and Thresh_H/L denotes a threshold value which the signal characteristic value of the candidate cell satisfies.

For example, if the RAT of the candidate cell is EUTRAN, $Treselection_{EUTRAN}=10$ seconds, SF_P_high=1 and SF_P_low=1.4. In this case, $Treselection_{EUTRAN}\_high=10$ seconds and $Treselection_{EUTRAN}\_low*=14$ seconds. In other embodiments, other values may be used.

In FIG. 14, candidate cells of the priority equal to or lower than the serving cell are equally treated. However, separate restriction time durations may be defined with respect to the candidate cells having the priority equal to the serving cell. For example, the following criterion may be added to FIG. 14. In this case, the flowchart may be modified accordingly.

Criteria 1—Candidate cell having the priority equal to the serving cell $$(Snonserving\_E > Thresh\_E)_{satisfaction\_time} >$$
$$TreselectionRAT \times SF\_P\_equal$$

Figure 15:
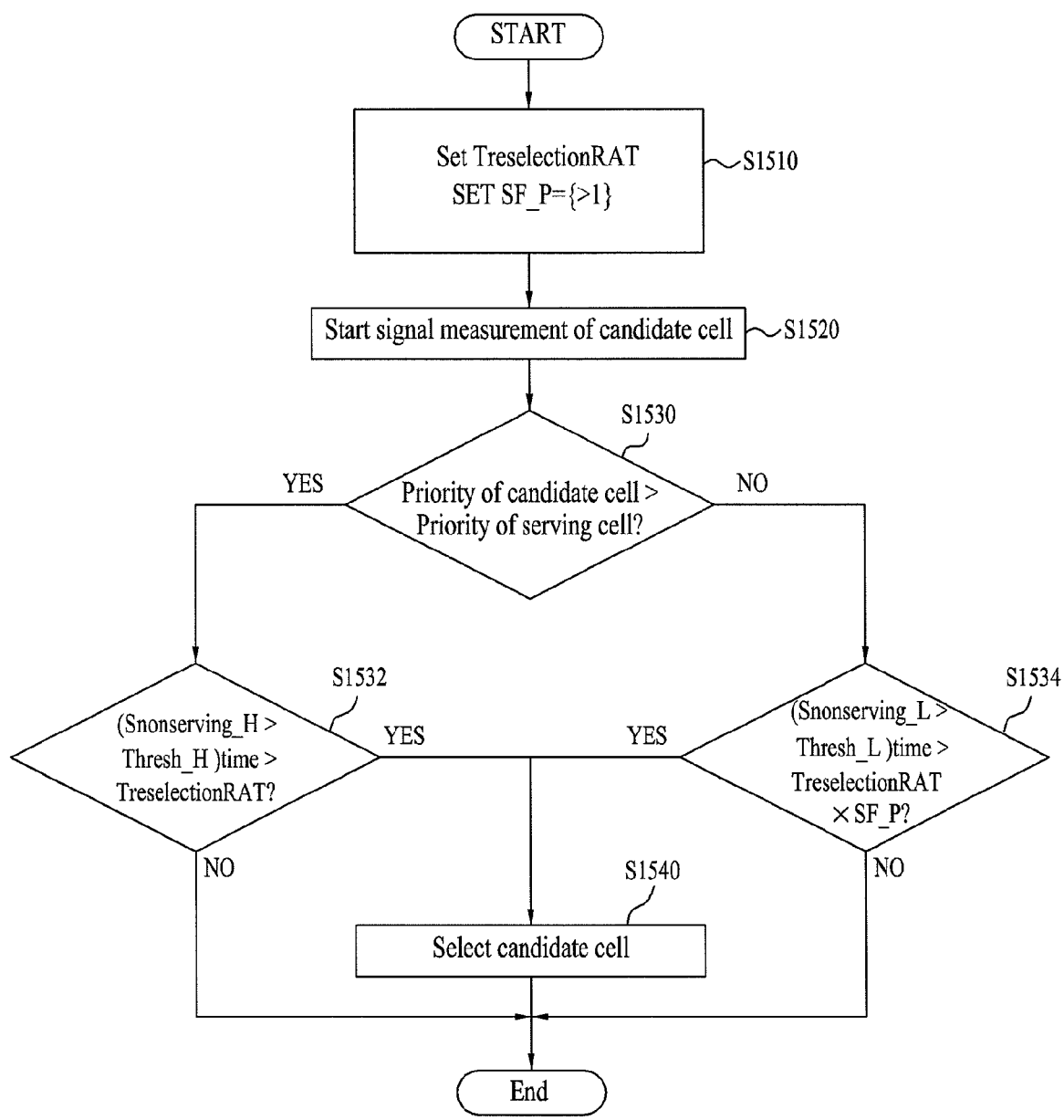
FIG. 15 is a flowchart illustrating cell reselection according to another embodiment of the present invention.

Case 3: The basic restriction time duration and one SF_P are used:

FIG. 15 shows the case where one scaling factor_P (SF_P) which would be applied according to the priority and the restriction time duration set per RAT are used.

In order to differentiate the restriction times duration according to the priority, the UE sets TreselectionRAT and SF_P (S1510). If the cell reselection is started, the UE starts to measure the signal of the candidate cell (S1520). The signal measurement process is continuously performed until the cell reselection process is finished. In the actual cell reselection process, the signal characteristic value obtained from the measured signal is used. The examples of the signal characteristic value include a reference symbol received power (RSRP), a reference symbol received Quality (RSRQ) and a received signal strength indicator (RSSI). While the signal of the candidate cell is measured, the UE determines whether the priority of the candidate cell is higher than the serving cell (S1530). Thereafter, the UE determines whether or not the candidate cell satisfies the criterion for the cell reselection in consideration of the relative priority of the candidate cell (S1532 and S1534). If the UE determines that none of the candidate cells satisfy the criterion, the process ends. If the UE determines that one of the candidate cells satisfies the criterion, the UE selects the candidate cell satisfying the criterion (S1540). The criterion for the cell reselection is as follows according to the relative priority of the candidate cell.

Criteria 1—Candidate cell having a priority higher than the serving cell:

$$(Snonserving\_^H > Thresh\_H)_{satisfaction\_time} >$$
$$TreselectionRAT\_high* = TreselectionRAT$$

Criteria 2—Candidate cell having a priority equal to or less than the serving cell:

$$(Snonserving\_L > Thresh\_L)_{satisfaction\_time} >$$
$$TreselectionRAT\_low^* = TreselectionRAT \times SF\_P$$

where, Snonserving_H/L denotes the signal characteristic value of the candidate cell and Thresh_H/L denotes a threshold value which the signal characteristic value of the candidate cell satisfies.

For example, if the RAT of the candidate cell is EUTRAN, $Treselection_{EUTRAN}$=10 seconds and SF_P=1.4. In this case, $Treselection_{EUTRAN}$_high=10 seconds and $Treselection_{EUTRAN}$_low*=14 seconds. In other embodiments, other values may be used.

Reception/Setup of the Restriction Time Duration

The information for differentiating the restriction time duration according to the priority may be defined between the UE and the base station in advance or may be received from the base station. The information about the restriction time duration may indicate a plurality of restriction time durations which are differently set according to the priority, or the restriction time duration may indicate a basic restriction time duration and one or more SF_PS. The plurality of restriction time durations and the basic restriction time duration may be differently set per RAT. The SF_P may be differently set per frequency or RAT.

Figure 16A:
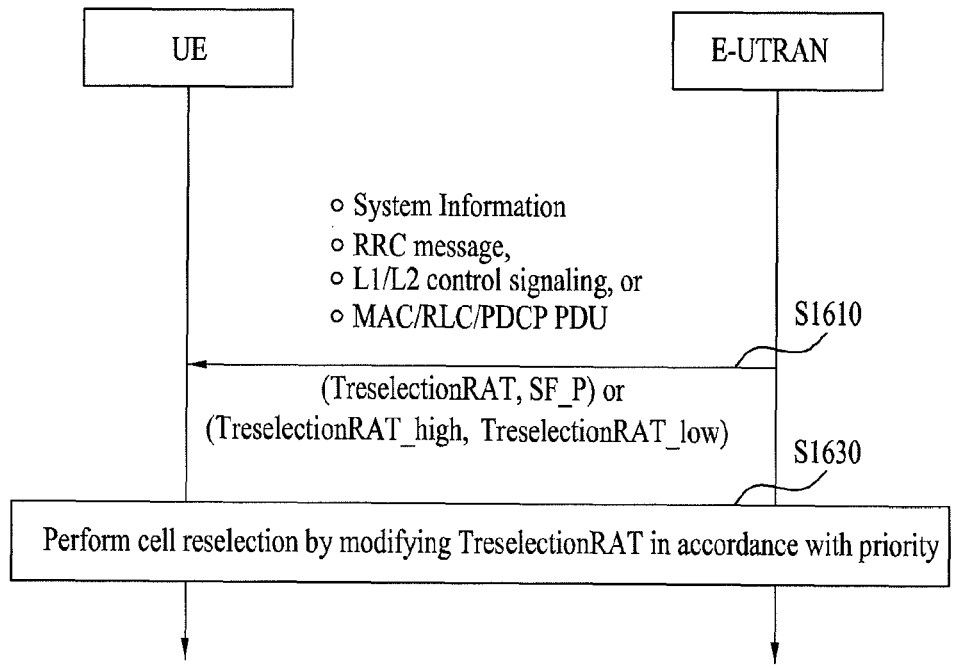
FIG. 16A is a view showing an example of receiving information about a restriction time duration for cell reselection according to an embodiment of the present invention.

FIG. 16A illustrates an example of receiving in a UE information about a restriction time duration from a base station according to an embodiment of the present invention. The information about the restriction time duration may be delivered to a UE via SI, a RRC message, L1/L2 control signaling (e.g., PDCCH), a MAC/RLC/PDCP PDU or the like. The RRC signal may be a signal associated with RRC connection release, RRC connection request, RRC connection setup, radio bearer setup, radio bearer reconfiguration, RRC connection reconfiguration or RRC connection re-establishment.

As seen in FIG. 16A, the UE receives the information about the restriction time duration from a network (S1610). The information about the restriction time duration may be (TreselectionRAT, SF_P), (TreselectionRAT, SF_P_1, SF_P_2), (TreselectionRAT, SF_P_1, . . . , SF_P_n) or (TreselectionRAT_high, TreselectionRAT_low). Thereafter, the UE performs the cell reselection by changing TreselectionRAT* according to the priority of the cell (S1630).

The information about the restriction time duration may be UE-common or UE-specific. If the information about the restriction time duration is UE-common, the information about the restriction time duration may be common to the PLMN units, the registered area units, tracking area (TA) units, cell units, group units or RAT units. For example, the information about the restriction time duration may be delivered to all UEs in the cell via SI. In addition, if the information about the restriction time duration is UE-specific, the information about the restriction time duration is delivered via the RRC connection release such that only a certain UE performs the operation according to the embodiment of the present invention. That is, the method of transmitting the information about the restriction time duration and the range of the UE to which the information about the restriction time duration is applied may be changed depending on whether the information about the restriction time duration is UE-common or UE-specific.

The information about the restriction time duration may be periodically/non-periodically provided by the base station. Also, the information about the restriction time duration may become invalid. For example, if the information about the restriction time duration is UE-common and if the PLMN, the registered area, the TA, the group or the RAT is changed, the information about the restriction time duration may become invalid. In addition, if the information about the restriction time duration is UE-specific, the information about the restriction time duration may become invalid while the UE transits from the idle mode to the connected mode. That is, the information about the restriction time duration may become invalid by a certain RRC signal for moving the UE from the idle mode to the connected mode. For example, the information about the restriction time duration may become invalid when the UE sends the RRC connection request, when the RRC connection setup is received from the base station or when the RRC connection complete is sent to the base station. Alternatively, the information about the restriction time duration may become invalid while the UE transits from the connected mode to the idle mode. That is, the information about the restriction time duration may become invalid by a certain RRC signal for moving the UE from the connected mode to the idle mode. For example, the information about the restriction time duration may become invalid by the RRC connection release.

The information about the restriction time duration may become invalid when a predetermined time elapses after the UE receives the information about the restriction time duration.

Figure 16B:
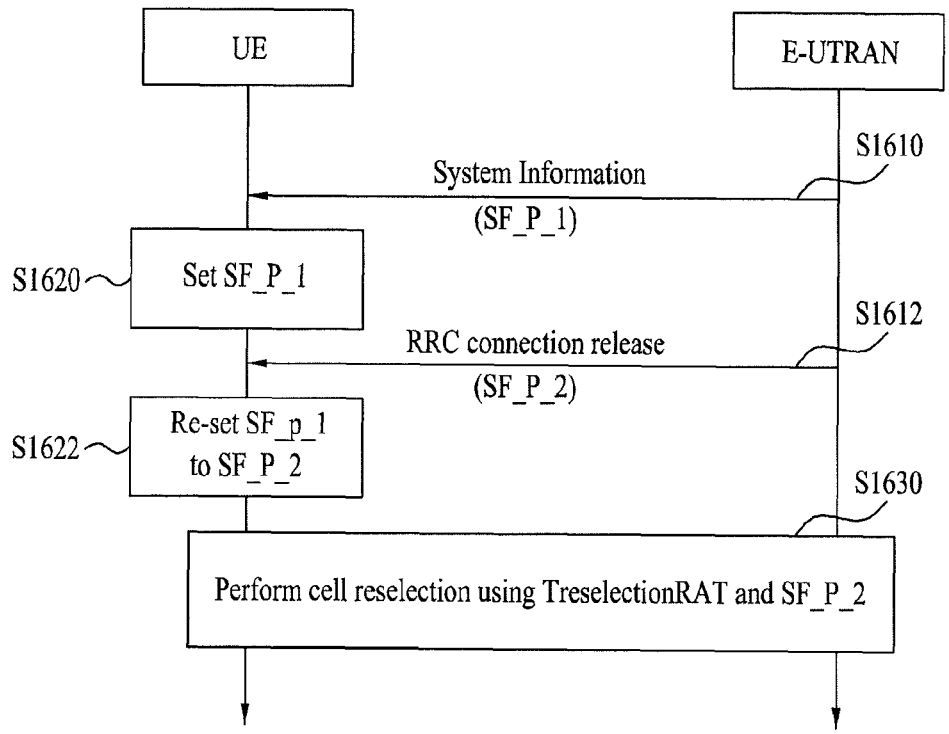
FIG. 16B is a view showing an example of performing cell reselection when a scaling factor associated with a restriction time duration for cell reselection is repeatedly received, according to an embodiment of the present invention.

FIG. 16B illustrates an example of performing cell reselection in the UE when information about a restriction time duration is repeatedly received, according to an embodiment of the present invention.

The UE may repeatedly receive the information about the restriction time duration from a network. In this case, the restriction time durations instructed by the network may be different or equal. When the UE repeatedly receives the information about the restriction time duration, the UE may apply UE-specific information more preferentially than UE-common information. In addition, the UE may more preferentially apply information about the restriction time duration received by a certain method than information about the restriction time duration received by another method.

As seen in FIG. 16B, the UE may receive SF_P_1 via SI (S1610) and receive SF_P_2 via the RRC connection release (S1612). In this case, the UE may ignore SF_P_1 received from the SI and perform cell reselection using SF_P_2 and TreselectionRAT set per RAT (S1620, S1622 and S1630). Thereafter, the UE in the idle mode may be RRC-connected to the base station in order to receive a service from a base station, and SF_P_2 which was previously received by the RRC connection release may become invalid. In addition, if the information about the restriction time duration is not received from the base station at RRC connection release after the UE receives the service from the base station, the UE returned to the idle mode may perform the cell reselection using the information about the restriction time duration before the RRC connection or perform the cell reselection using the information about the restriction time duration which is newly received from the SI.

In the embodiment of the present invention, the UE may differently apply the restriction time duration for the cell reselection in consideration of the frequency, the RAT or the combination thereof. Accordingly, restriction time duration for reselecting a cell of a high priority may be set to be shorter than restriction time duration for reselecting a cell of a low priority. Accordingly, an opportunity for, at the UE, receiving a service from a cell of a high priority increases compared with an opportunity for receiving a service from a cell of a low priority. In addition, it is possible to efficiently reduce power consumption due to the mobility of the UE by reducing a process of measuring a cell of a high priority. In addition, it is possible to ensure service quality to the UE by preferentially selecting a cell of a high priority.

The above-described embodiments are combinations of components and features of the present invention in a predetermined form. The components or features are optionally considered unless otherwise stated. The components or features may be implemented without being combined with other components or features. The embodiments of the present invention may be configured by combinations of some of the components and/or features. The order of the operations described in the embodiments of the present invention may be modified. Some of the components or features of any embodiment may be included in another embodiment or may be replaced with the corresponding components or features of another embodiment. It will be apparent to those skilled in the art that claims which are not explicitly associated are combined so as to configure an embodiment or may be included as a new claim by an amendment after application.

In the present specification, the embodiments of the present invention will be described concentrating on the transmission/reception of data between the UE and the base station. A certain operation which is performed by the base station may be performed by an upper node, if necessary. That is, various operations performed by the network including a plurality of network nodes including the base station for communication with the UE may be performed by the base station or other network nodes except the base station. The term "base station" may be replaced with a fixed station, a Node B, an eNode B (eNB), or an access point. In addition, the term "UE" may be replaced with a mobile station (MS) or a mobile subscriber station (MSS).

The embodiments of the present invention may be implemented by various units, for example, hardware, firmware, software or a combination thereof. In particular, the previously described UE, eNB and MME devices include one or more processors configured to execute the corresponding steps shown in FIGS. 11-16. The previously described UE, eNB and MSS devices also include network interface devices and other communication modules. The previously described UE, eNB and MSS devices may also include display and input devices or components.

Various embodiments of the present invention may be implemented by one or more application specific integrated circuits (ASICs), digital signal processors (DSPs), digital signal processing devices (DSPDs), programmable logic devices (PLDS), field programmable gate arrays (FPGAs), processors, controllers, micro controllers or microprocessors.

Various embodiments of the present invention may be implemented in the form of software modules, procedures or functions for performing the above-described functions or operations. A software code may be stored in a memory unit and operated by a processor. The memory unit may be located inside or outside the processor so as to exchange data with the processor by various known units.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The present invention can be applied to a wireless communication system. More specifically, the present invention can be applied to a method of reselecting a cell in a wireless communication system.

What is claimed is:

1. A method of performing cell reselection based on priorities in a wireless communication system, the method comprising the steps of:
   measuring, by a device, signal characteristics of a plurality of candidate cells;
   determining, by the device, whether or not a measured signal characteristic of one of the plurality of candidate cells satisfies a predetermined criterion for a predetermined time duration established for the one of the plurality of candidate cells, wherein the predetermined time duration corresponds to a priority of the one of the plurality of candidate cells; and
   performing, by the device, cell reselection by selecting the one of the plurality of candidate cells when the measured signal characteristic satisfies the predetermined criterion for the predetermined time duration,
   wherein a predetermined time duration established for a high priority candidate cell is shorter than a predetermined time duration established for a low priority candidate cell.

2. The method of claim 1, wherein the priority comprises one of:
   a priority related to a frequency of the corresponding candidate cell, a priority related to a radio access technology (RAT) of the corresponding candidate cell, and a combination thereof.

3. The method of claim 1, wherein the step of determining comprises:
   determining whether or not the measured signal characteristic is equal to or greater than a predetermined threshold value.

4. The method of claim 1, wherein the predetermined time duration established for the one of the plurality of candidate cells comprises one of:
   a UE-common predetermined time duration; and
   a UE-specific predetermined time duration.

5. The method of claim 1, wherein the priority of the one of the plurality of candidate cells comprises:
   a priority relative to a priority of a serving cell.

6. The method of claim 5, wherein the predetermined time duration comprises:
   a first predetermined time duration when the priority of the one of the plurality of candidate cells is higher than the priority of the serving cell; and
   a second predetermined time duration when the priority of the one of the plurality of candidate cells is lower than the priority of the serving cell,
   wherein the first predetermined certain time duration is less than the second predetermined certain time duration.

7. The method of claim 5, wherein the predetermined time duration comprises:
   a first predetermined time duration when the priority of the one of the plurality of candidate cells is higher than the priority of the serving cell;
   a second predetermined time duration when the priority of the one of the plurality of candidate cells is equal to the priority of the serving cell; and
   a third predetermined time duration when the priority of the one of the plurality of candidate cells is lower than the priority of the serving cell,
   wherein the first predetermined time duration<the second predetermined time duration≦the third predetermined time duration, or the first predetermined time duration≦the second predetermined time duration<the third predetermined time duration.

8. The method of claim 1, further comprising:
receiving information from a network about the predetermined time duration established for the one of the plurality of candidate cells.

9. The method of claim 8, wherein the step of receiving information comprises:
receiving a plurality of predetermined time durations corresponding to the priority of the one of the plurality of candidate cells.

10. The method of claim 8, wherein the step of receiving information comprises:
receiving the predetermined time duration corresponding to the priority of the one of the plurality of candidate cells, the predetermined time duration defined per RAT and one or more scaling factors, wherein the predetermined time duration is multiplied by one of the one or more scaling factors according to the priority of the one of the plurality of candidate cells.

11. The method of claim 8, wherein the step of receiving the information comprises:
receiving the information via one of a system information (SI) message, a radio resource control (RRC) message, L1/L2 control signaling, and a medium access control (MAC)/radio link control (RLC)/packet data convergence protocol (PDCP) protocol data unit (PDU).

12. The method of claim 1, wherein the step of performing cell reselection comprises:
performing one of inter-frequency cell reselection and inter-RAT cell reselection.

\* \* \* \* \*